(12) United States Patent
Kuo

(10) Patent No.: US 9,935,669 B1
(45) Date of Patent: Apr. 3, 2018

(54) PROTECTION ENCLOSURE OF PORTABLE ELECTRONIC DEVICE

(71) Applicant: Kuo-Tang Kuo, Taichung (TW)

(72) Inventor: Kuo-Tang Kuo, Taichung (TW)

( * ) Notice: Subject to any disclaimer, the term of this patent is extended or adjusted under 35 U.S.C. 154(b) by 0 days.

(21) Appl. No.: 15/455,147

(22) Filed: Mar. 10, 2017

(51) Int. Cl.
*H04B 1/3888* (2015.01)
*G06F 1/16* (2006.01)
*H04M 1/02* (2006.01)

(52) U.S. Cl.
CPC ......... *H04B 1/3888* (2013.01); *G06F 1/1626* (2013.01); *H04M 1/0202* (2013.01)

(58) Field of Classification Search
CPC .............................. H04B 1/3888; G06F 1/1626
See application file for complete search history.

(56) References Cited

U.S. PATENT DOCUMENTS

2016/0128210 A1* 5/2016 Lee ........................... F16B 1/00
248/206.5

2016/0150861 A1* 6/2016 Yao ......................... A45C 11/00
224/245

* cited by examiner

*Primary Examiner* — Tuan H Nguyen
(74) *Attorney, Agent, or Firm* — Leong C. Lei

(57) ABSTRACT

A protection enclosure of an portable electronic device includes a protective frame including a protective frame main body in which the portable electronic device is received and held and multiple protective frame magnetic members, which are arranged in the protective frame main body at intervals and grouped as at least one lateral protective frame magnetic attraction row and at least one longitudinal protective frame magnetic attraction row perpendicular to the lateral protective frame magnetic attraction row; and a protective cover including a protective cover main body having a bottom board, an end board, and a connection board connected between the bottom board and the end board and multiple protective cover magnetic members arranged, at intervals, on the end board to form at least one protective cover magnetic attraction row. Foldability is available between the bottom board and the connection board and also between the connection board and the end board.

11 Claims, 29 Drawing Sheets

PROTECTION ENCLOSURE OF PORTABLE ELECTRONIC DEVICE

(a) TECHNICAL FIELD OF THE INVENTION

The present invention relates generally to an accessory of a portable electronic device, and more particularly to a protection enclosure of a portable electronic device.

(b) DESCRIPTION OF THE PRIOR ART

As shown in FIGS. 1 and 2, a conventional protection enclosure 1 comprises a protective frame 2 and a protective cover 3 pivotally connected together. The protective frame 2 may receive and hold a portable electronic device (such as a mobile phone and a tablet computer) therein. The protective cover 3 may be closed on and covers the portable electronic device or may be lifted open to allow the protective frame 2 to rotate so that the protective frame 2 and the portable electronic device can be positioned in an upright condition (as show in FIG. 1) or in a horizontal condition (as shown in FIG. 2) to allow for easy viewing by a user.

However, for the know protection enclosure 1 discussed above, the angular positions of the protective frame 2 and the portable electronic device that can be made through adjustment are sufficient, and skidding may easily occur between the protective frame 2 and the protective cover 3 and thus the angular position may be hard to control and fix. Further, since the protective frame 2 and the protective cover 3 are not separable from each other, the protective cover 3 may shield a camera lens provided on the portable electronic device when a user wishes to take a picture or make video recording with the portable electronic device. In addition, the protective cove 3 may cause shaking or vibration when the portable electronic device is hand held for playing a video game, or the overall weight may be excessively large and leads to undesired inconvenience.

In another known protection enclosure 4 shown in FIGS. 3-6, a protective frame 5 is similarly included, and a protective cover 6 is pivotally connected to one side of the protective frame 5. The protective cover 6 is provided with a plurality of longitudinal, lateral, and inclined folding lines 7. The protective frame 5 is provided for receiving, in a similar way, and holding a portable electronic device therein. The protective frame 5 and the portable electronic device can be set at various horizontal conditions (as shown in FIGS. 4 and 5) and vertical conditions (as shown in FIG. 6) of different angular positions by folding along the folding lines in different ways. This helps dissolves the issue of insufficiency of the number of positions that the device may take.

However, the protection enclosure 4 stills suffers the drawbacks that slipping may easily occur between the protective frame 5 and the protective cover 6 and also, the protective frame 5 and the protective cover 6 are not separable from each other. Further, other shortcomings, such as the protective cover 6 shielding the camera lens of the portable electronic device, the protective cover 6 causing shaking and vibration, and the overall weight being large, are also present.

SUMMARY OF THE INVENTION

In view of the above, to overcome the drawbacks of easy skidding, being hard to control and fix an angular position, and being inseparable between a protective frame and a protective cover that can be found in prior art protection enclosures of portable electronic devices, the present invention provides a protection enclosure of a portable electronic device, which generally comprises: a protective frame, which comprises a protective frame main body and a plurality of protective frame magnetic members, wherein the protective frame main body receives and holds therein a portable electronic device and the protective frame magnetic members are arranged, at intervals, on the protective frame main body and grouped as at least one lateral protective frame magnetic attraction row and at least one longitudinal protective frame magnetic attraction row perpendicular to the lateral protective frame magnetic attraction row; a protective cover, which comprises a protective cover main body and a plurality of protective cover magnetic members, wherein the protective cover main body comprises a bottom board, an end board and a connection board connected between the bottom board and the end board, such that foldability is available between the bottom board and the connection board and also between the connection board and the end board and the protective cover magnetic members are arranged, at intervals, on the end board and is grouped as at least one protective cover magnetic attraction rows. As such, the protective cover magnetic attraction row of the protective cover is selectively magnetically attached to the lateral protective frame magnetic attraction row or the longitudinal protective frame magnetic attraction row of the protective frame and the protective cover magnetic attraction row of the protective cover is selectively detachable from the lateral protective frame magnetic attraction row or the longitudinal protective frame magnetic attraction row of the protective frame in order to improve flexibility, stability, and convenience of use and operation.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 7-20, a first preferred embodiment of the present invention provides a protection enclosure of a portable electronic device, which is generally designated at 100, generally comprising a protective frame 10 and a protective cover 20.

Figure 1:
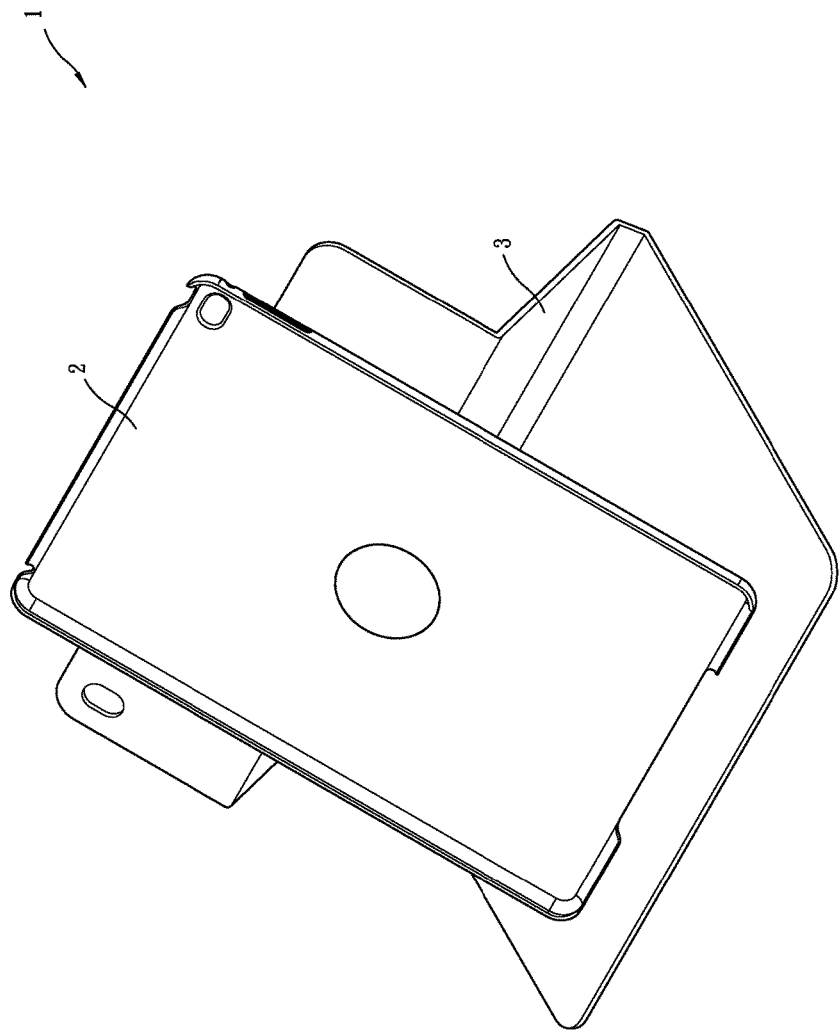
FIG. 1 is a perspective view showing a conventional protection enclosure of a portable electronic device in an upright condition.
Figure 2:
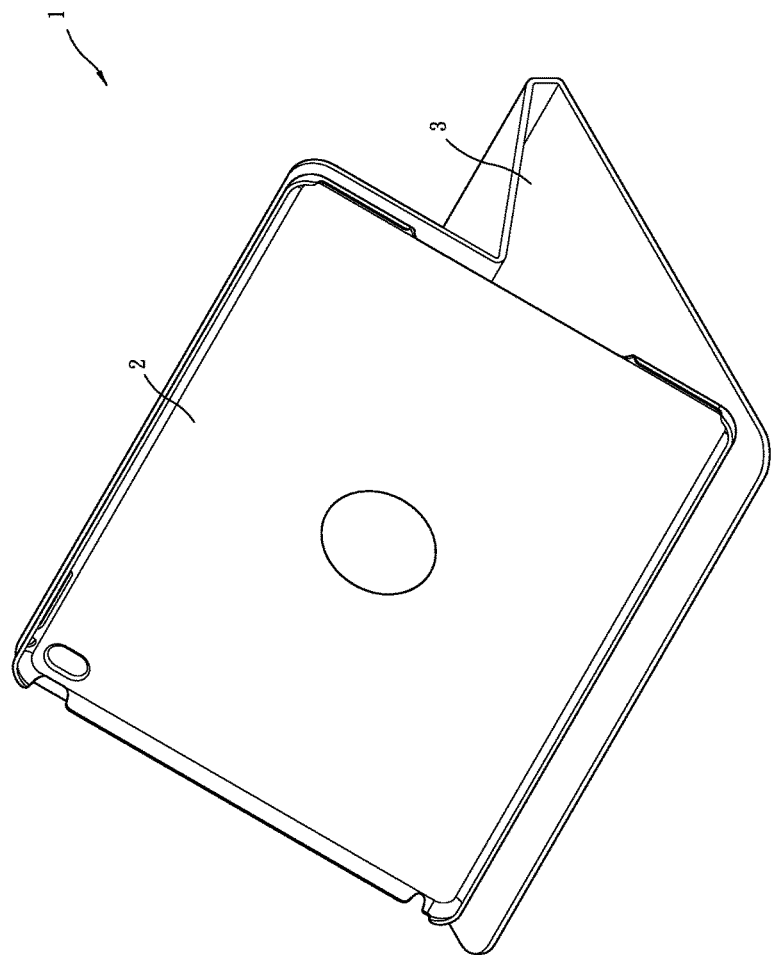
FIG. 2 is a perspective view showing the protection enclosure of the portable electronic device illustrated in FIG. 1 in a horizontal condition.
Figure 3:
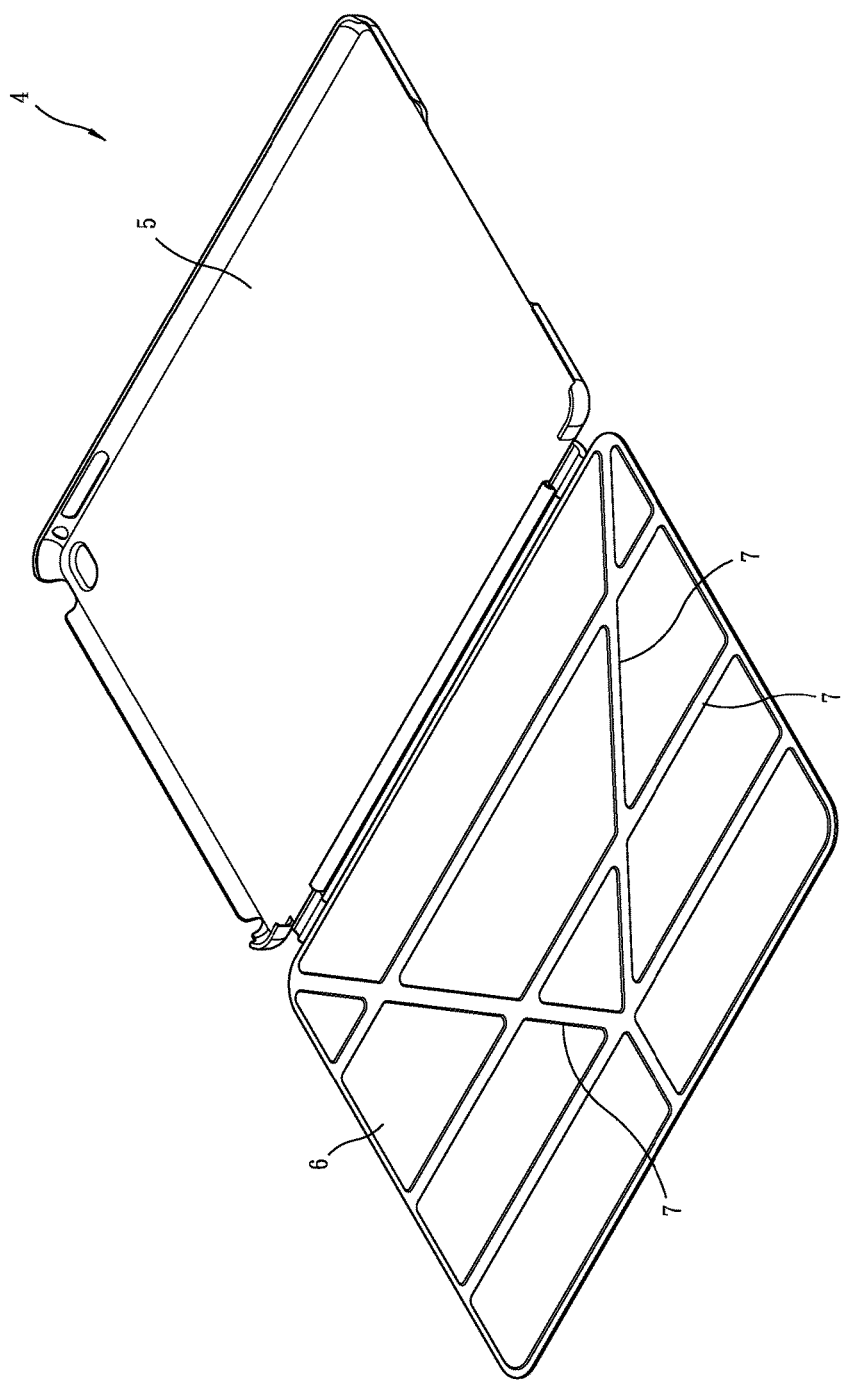
FIG. 3 is a perspective view showing another conventional protection enclosure of a portable electronic device.
Figure 4:
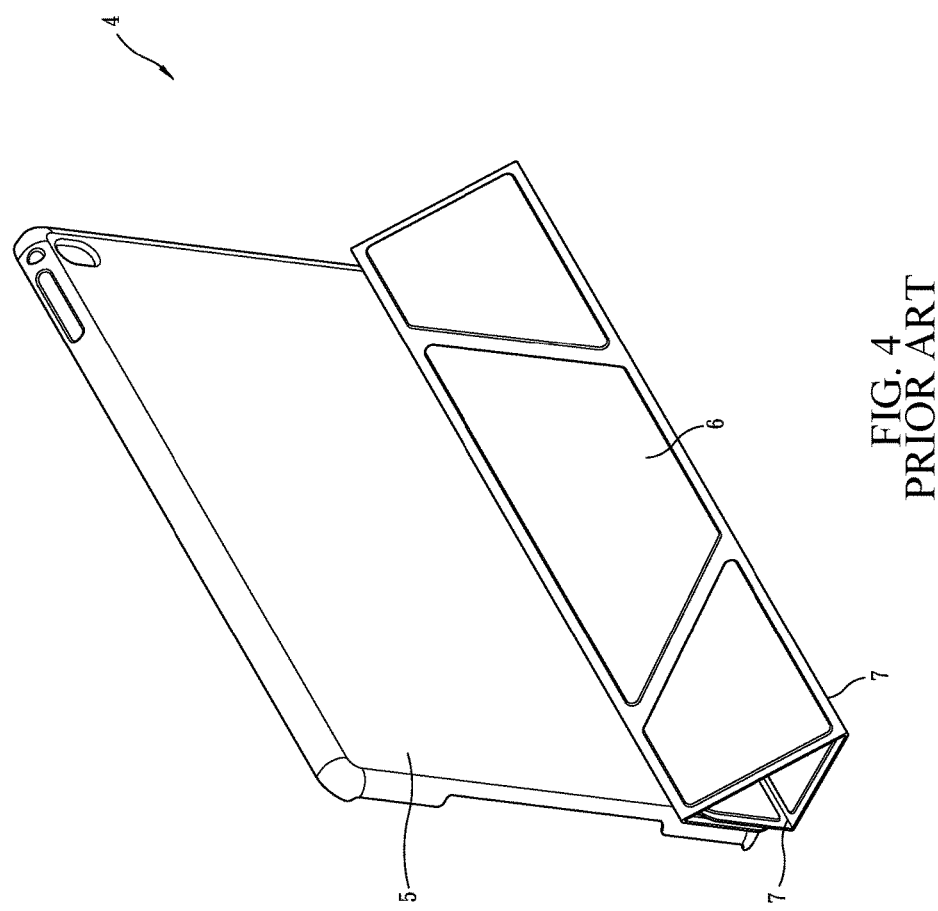
FIG. 4 is a perspective view showing the protection enclosure of the portable electronic device illustrated in FIG. 3 in a horizontal condition.
Figure 5:
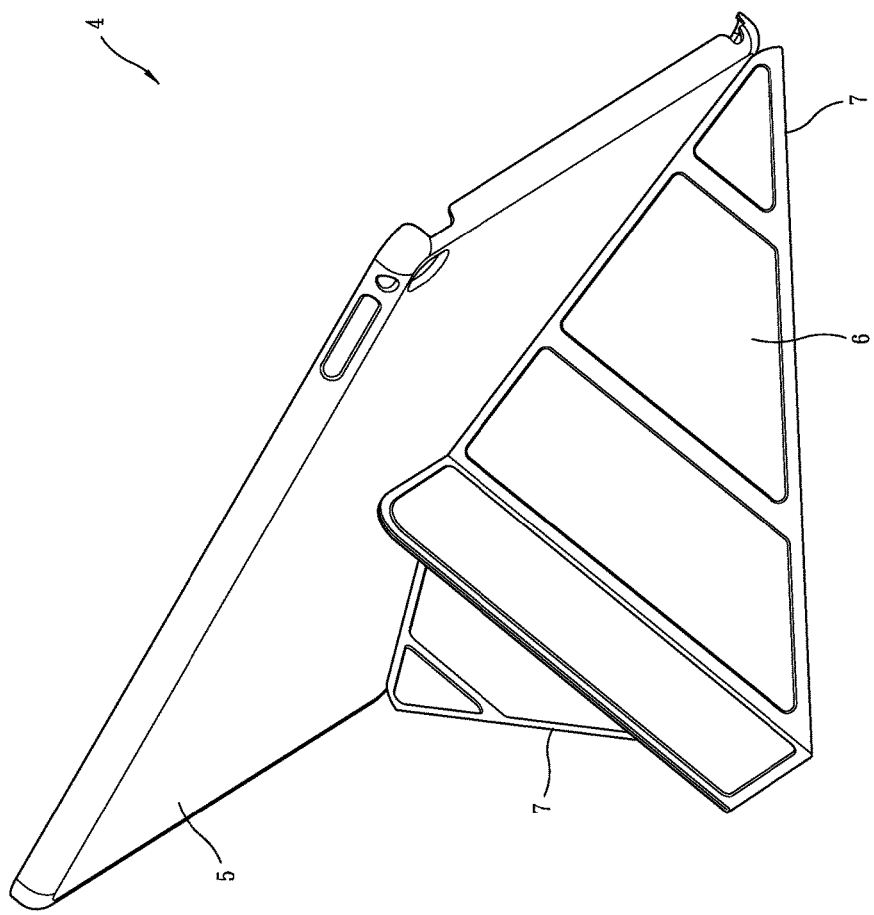
FIG. 5 is a perspective view showing the protection enclosure of the portable electronic device illustrated in FIG. 3 also in a horizontal condition, but configured in a different way.
Figure 6:
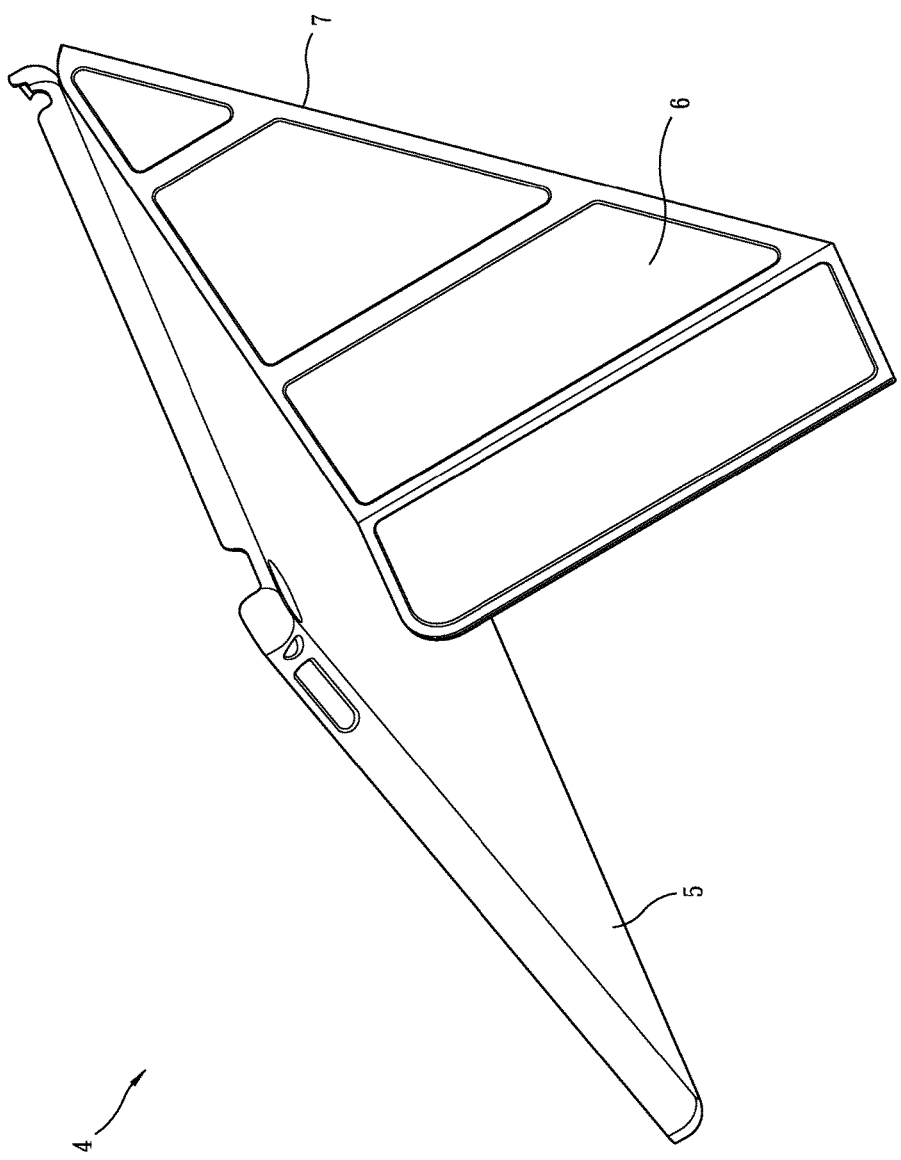
FIG. 6 is a perspective view showing the protection enclosure of the portable electronic device illustrated in FIG. 3 in a vertical condition.
Figure 7:
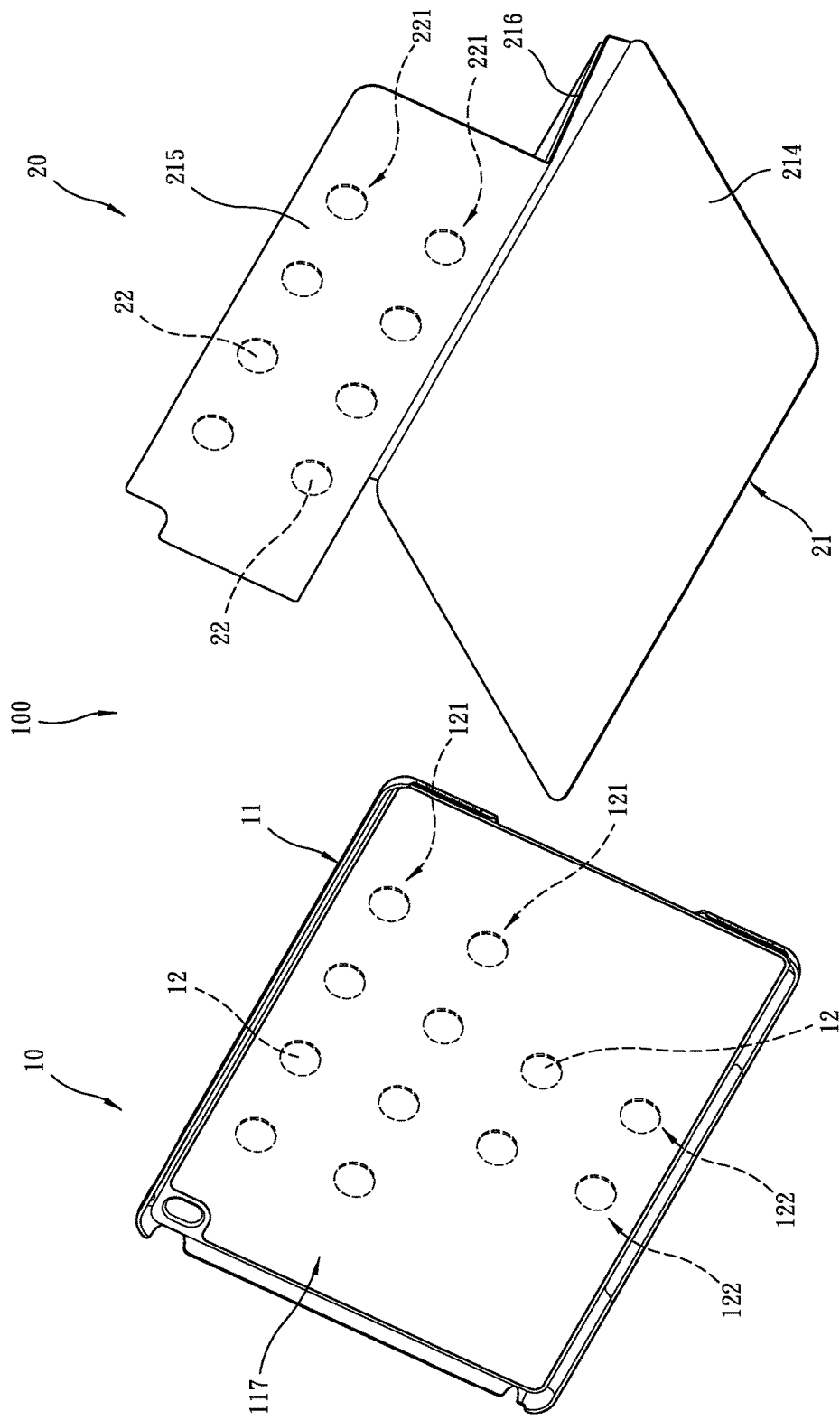
FIG. 7 is an exploded view showing a first embodiment of the present invention.
Figure 8:
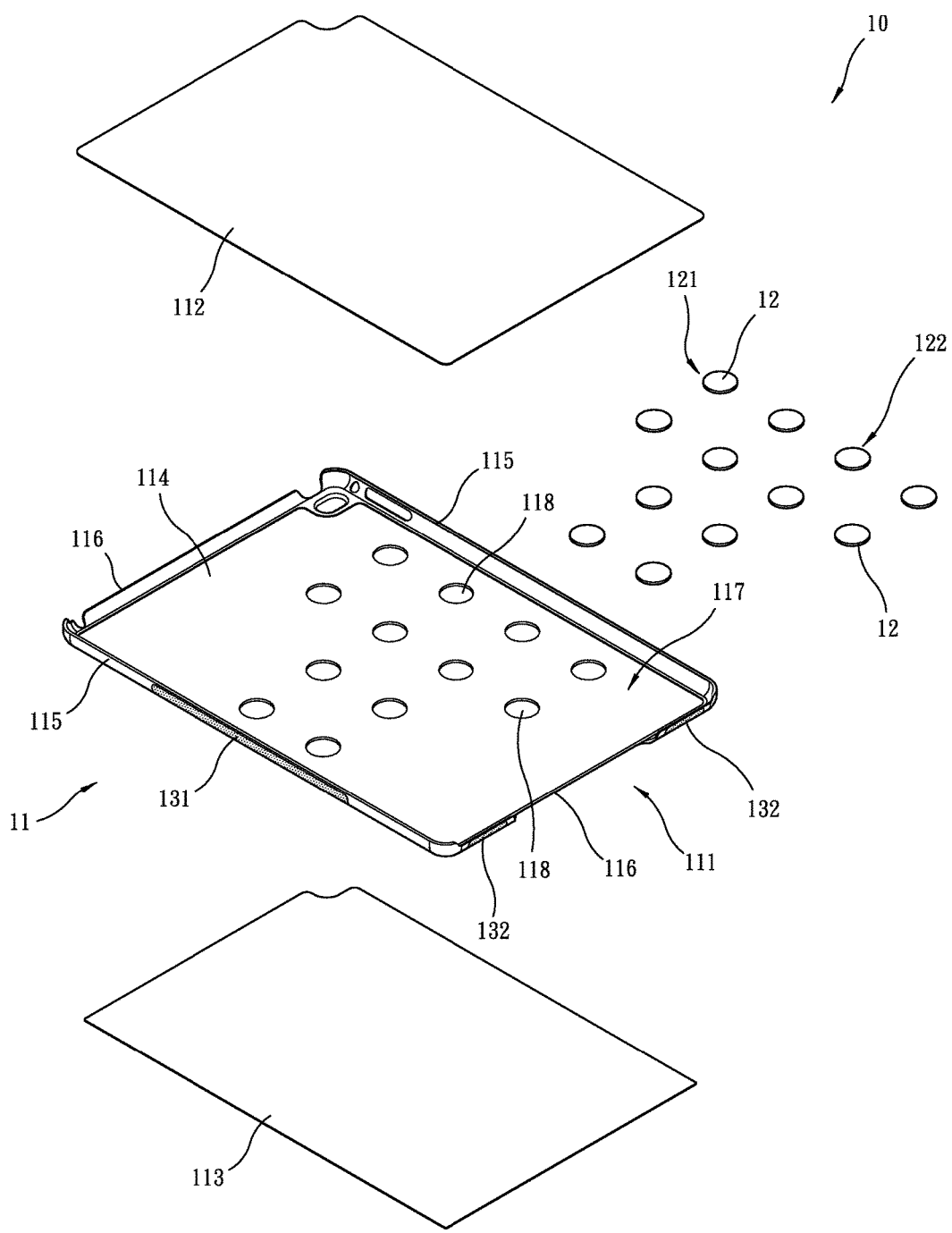
FIG. 8 is an exploded view showing a portion of the embodiment of the present invention illustrated in FIG. 7.
Figure 8A:
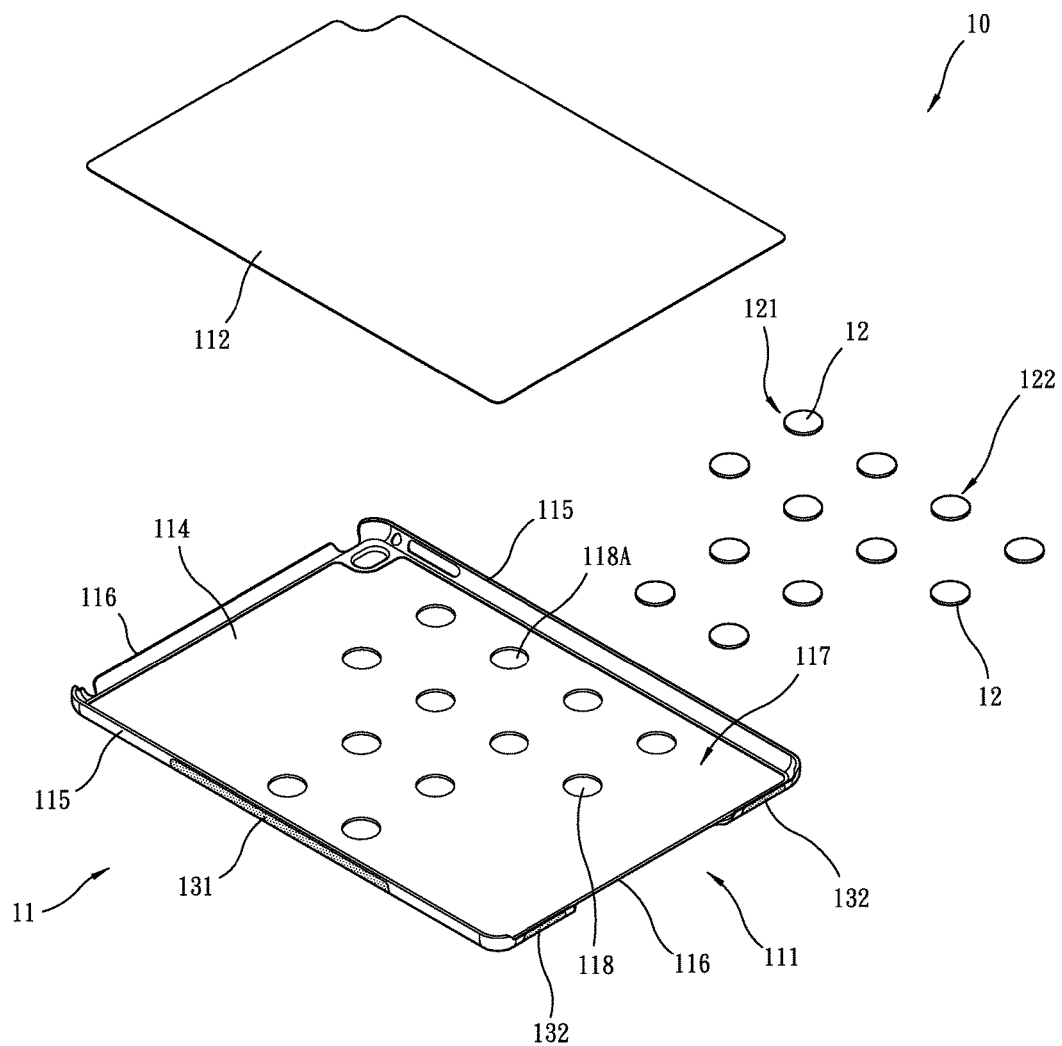
FIG. 8A shows another configuration of embodying a protective frame.
Figure 9:
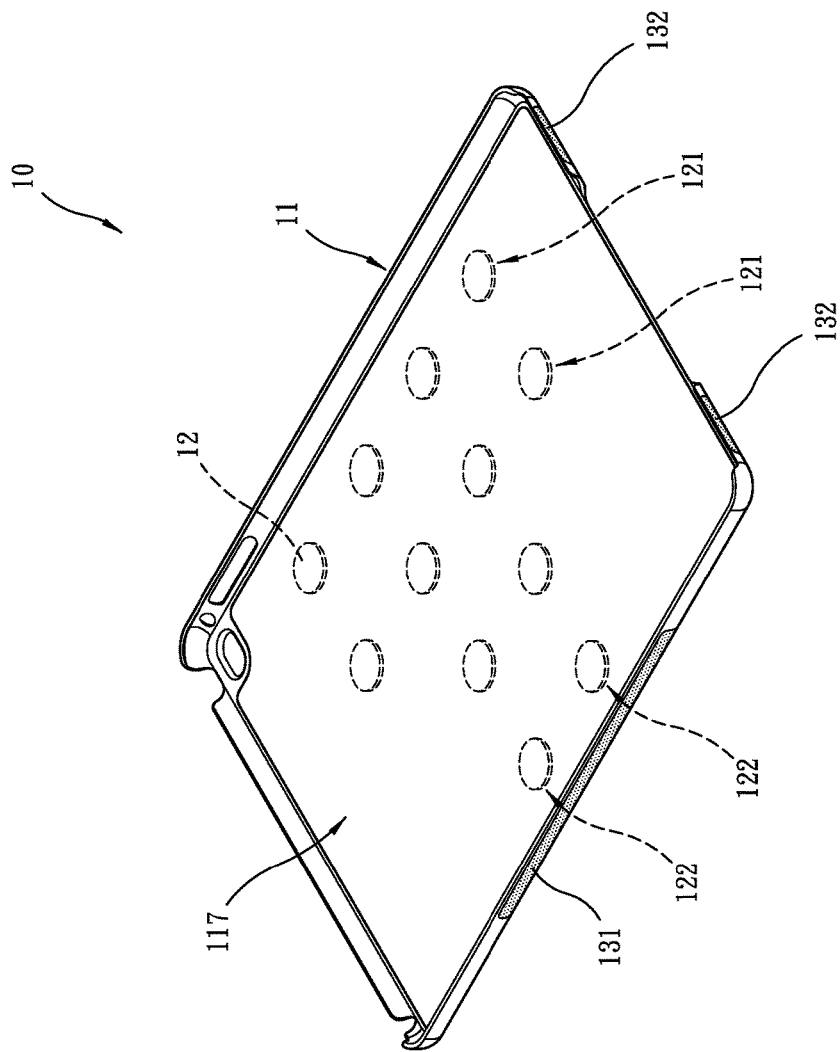
FIG. 9 shows an assembled condition of FIG. 8.

Referring to FIGS. 7-9, the protective frame 10 comprises a protective frame main body 11 and a plurality of protective frame magnetic members 12. The protective frame main body 11 comprises a frame body 111, a frame body inner covering member 112, and a frame body outer covering member 113. The frame body 111 comprises a bottom wall 114, two long sidewalls 115 that are respectively connected to two opposite side edges of the bottom wall 114 and two short sidewalls 116 that are respectively connected to another two opposite side edges of the bottom wall 114 such that the bottom wall 114, the two long sidewalls, and the two short sidewalls 116 collectively and circumferentially delimit and define a receiving space 117, in which a portable electronic device (such as a tablet computer) is received and retained. The bottom wall 114 is formed with a plurality of the protective frame accommodation recesses 118. At least one of the long sidewalls 115 of the frame body 111 is provided, on an outside surface thereof, with at least one long sidewall skidding preventing interface 131, and at least one of the short sidewalls 116 of the frame body 111 is provided, on an outside surface thereof, with at least one short sidewall skidding preventing interface 132. The frame body inner covering member 112 is set on and covers an inside surface of the bottom wall 114 and the frame body outer covering member 113 is set on and covers an outside surface of the bottom wall 114. The protective frame magnetic members 12 are received, at equal spacing intervals, in and retained in the protective frame accommodation recesses 118 and are covered by the frame body inner covering member 112 and the frame body outer covering member 113 so as to prevent the protective frame magnetic members 12 from detaching from and falling out of the frame body accommodation recesses 118. In addition, the protective frame magnetic members 12 are divided, according to arranged positions thereof, into two parallel, side-by-side, lateral protective frame magnetic attraction rows 121 and two parallel, side-by-side, longitudinal protective frame magnetic attraction rows 122, such that the longitudinal protective frame magnetic attraction rows 122 are substantially perpendicular to the lateral protective frame magnetic attraction rows 121. Referring to FIG. 8A, the protective frame accommodation recesses 118A can alternatively be non-penetrating concave troughs, which are also available in receiving and holding, respectively the protective frame magnetic members 12 therein. In this way, there is no need to provide the frame body outer covering member 113 to cover the outside surface of the bottom wall 114 and only the frame body inner covering member 112 is needed for covering the inside surface of the bottom wall 114, and this simplifying a manufacturing process.

Figure 10:
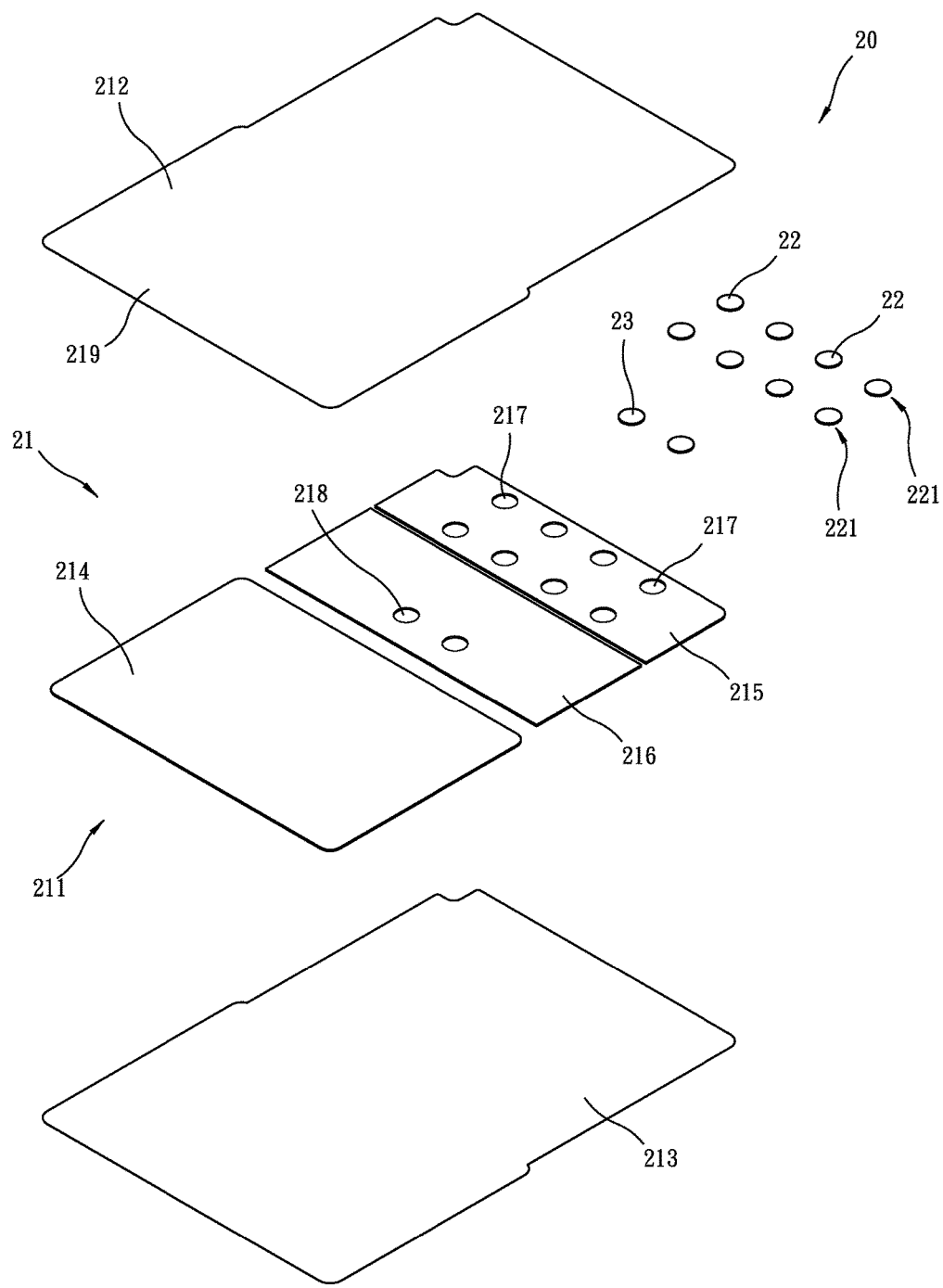
FIG. 10 is an exploded view showing a portion of the embodiment of the present invention illustrated in FIG. 7.
Figure 11:
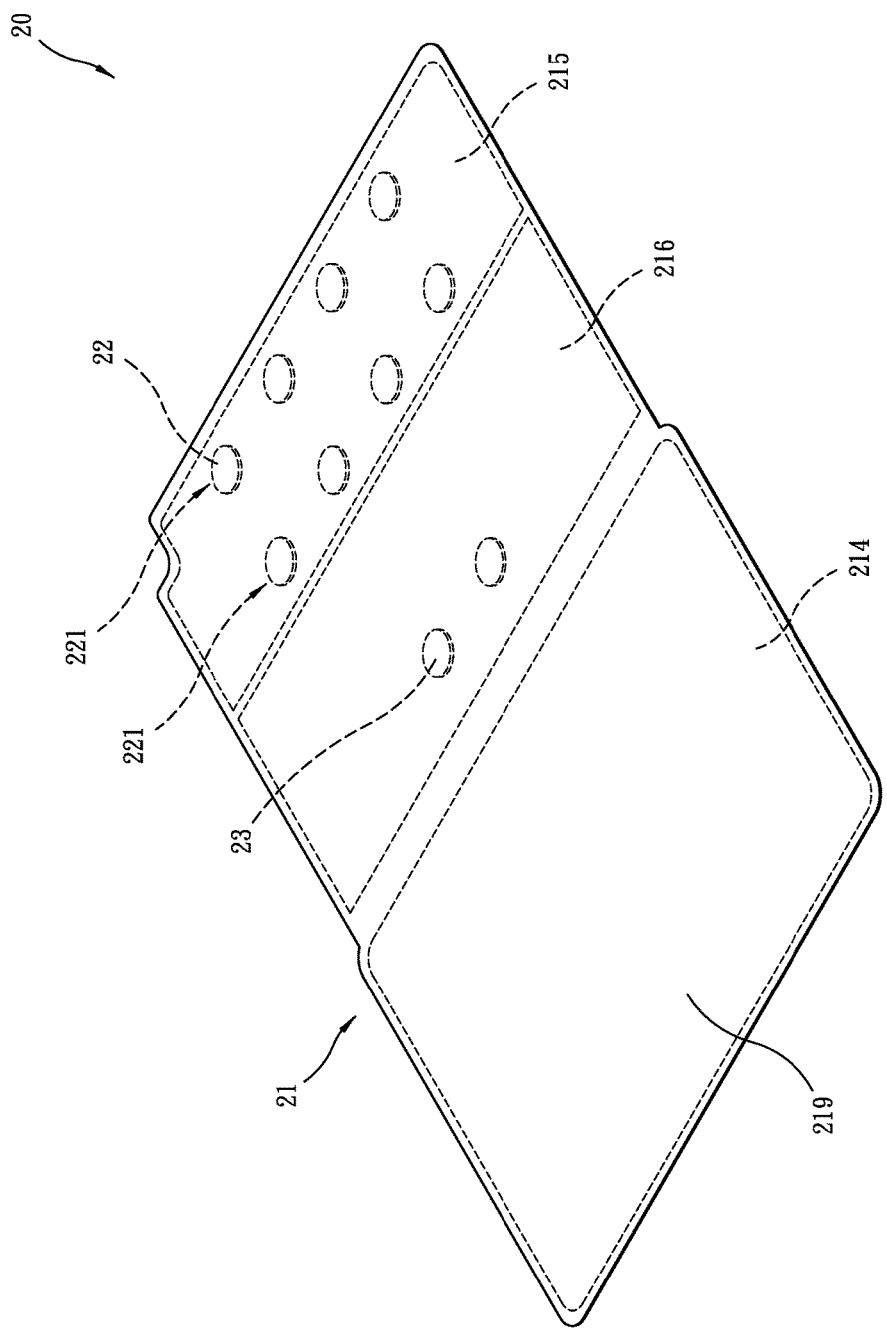
FIG. 11 shows an assembled condition of FIG. 10.

Referring to FIGS. 7, 10, and 11, the protective cover 20 comprises a protective cover main body 21, a plurality of protective cover magnetic members 22, and a plurality of secondary magnetic members 23. The protective cover main body 21 comprises a cover body 211, a cover body inner covering member 212, and a cover body outer covering member 213. The cover body 211 comprises a bottom board 214, an end board 215, and a connection board 216 that is arranged and connected between the bottom board 214 and the end board 215. The end board 215 is formed with a plurality of protective cover accommodation recesses 217, and the connection board 216 is formed with a plurality of secondary accommodation recesses 218. The cover body inner covering member 212 is set on and covers inside surfaces of the bottom board 214, the end board 215, and the connection board 216 of the cover body 211. The cover body outer covering member 213 is set on and covers outside surfaces of the bottom board 214, the end board 215, and the connection board 216 of the cover body 211 such that folding can be made between the bottom board 214 and the connection board 216 and between the connection board 216 and the end board 215. The protective cover magnetic members 22 are received, at equal spacing intervals, in and retained in the protective cover accommodation recesses 217, respectively, and the secondary magnetic members 23 are received, at equal spacing intervals, in and retained in the secondary accommodation recesses 218, respectively. All being covered by the cover body inner covering member 212 and the cover body outer covering member 213, the protective cover magnetic members 22 and the secondary magnetic members 23 are prevented from detaching from or falling out of the cover body the accommodation recesses 217 and the secondary accommodation recesses 218. The protective cover magnetic members 22 can be divided, according to arranged positions thereof, into two parallel, side-by-side, protective cover magnetic attraction rows 221. The cover body inner covering member 212 has a surface on which a protective cover skidding preventing interface 219 is provided.

Figure 12:
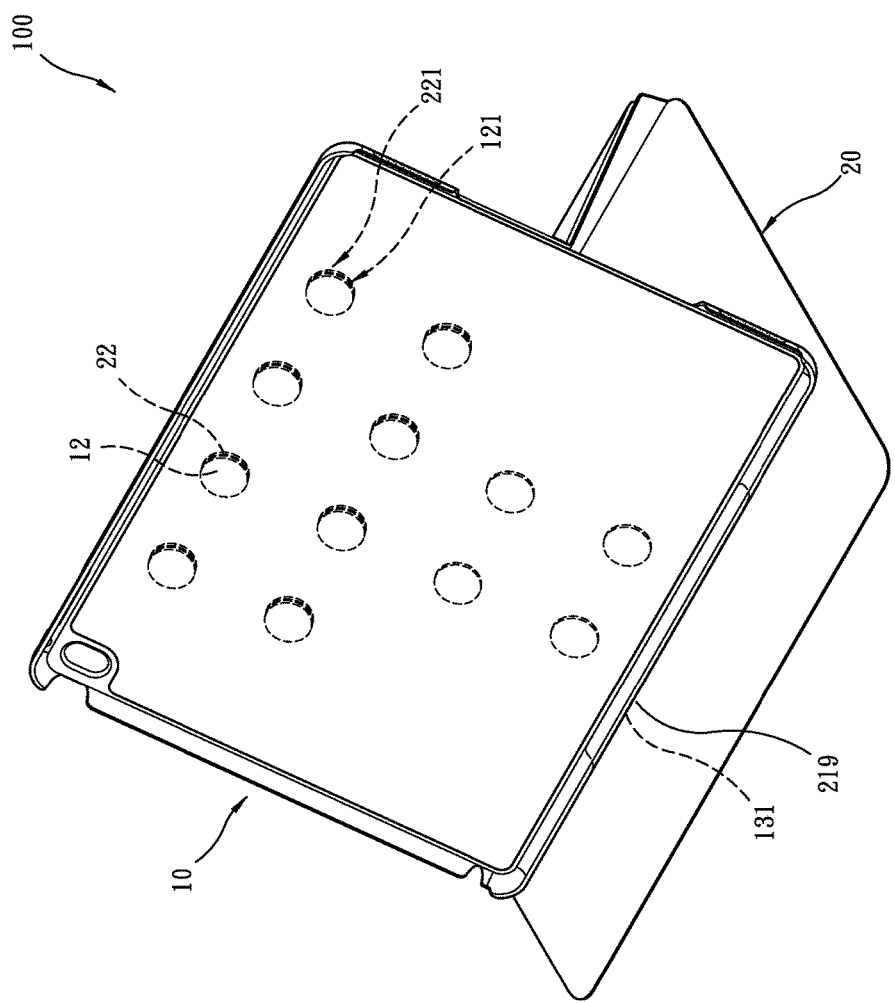
FIGS. 12-19 illustrate conditions of use of the embodiment illustrated in FIG. 7.
Figure 13:
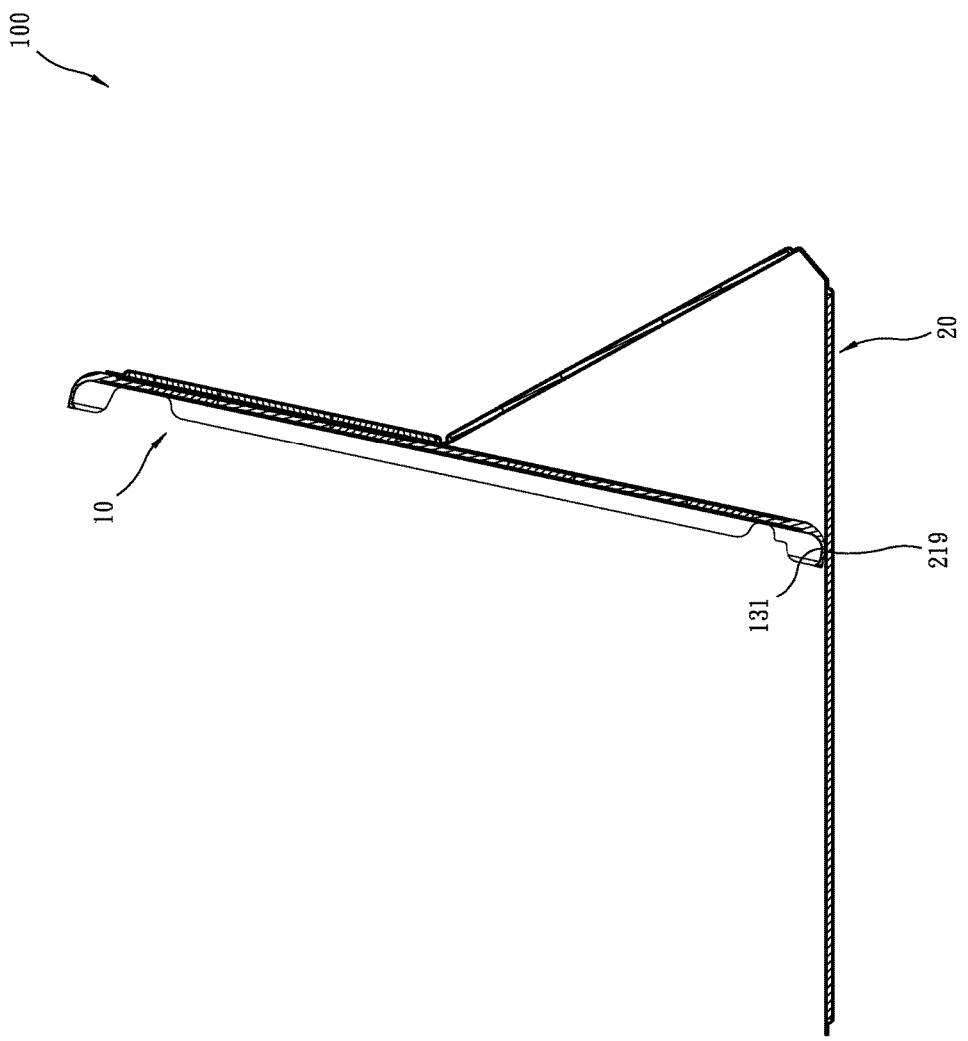
Figure 14:
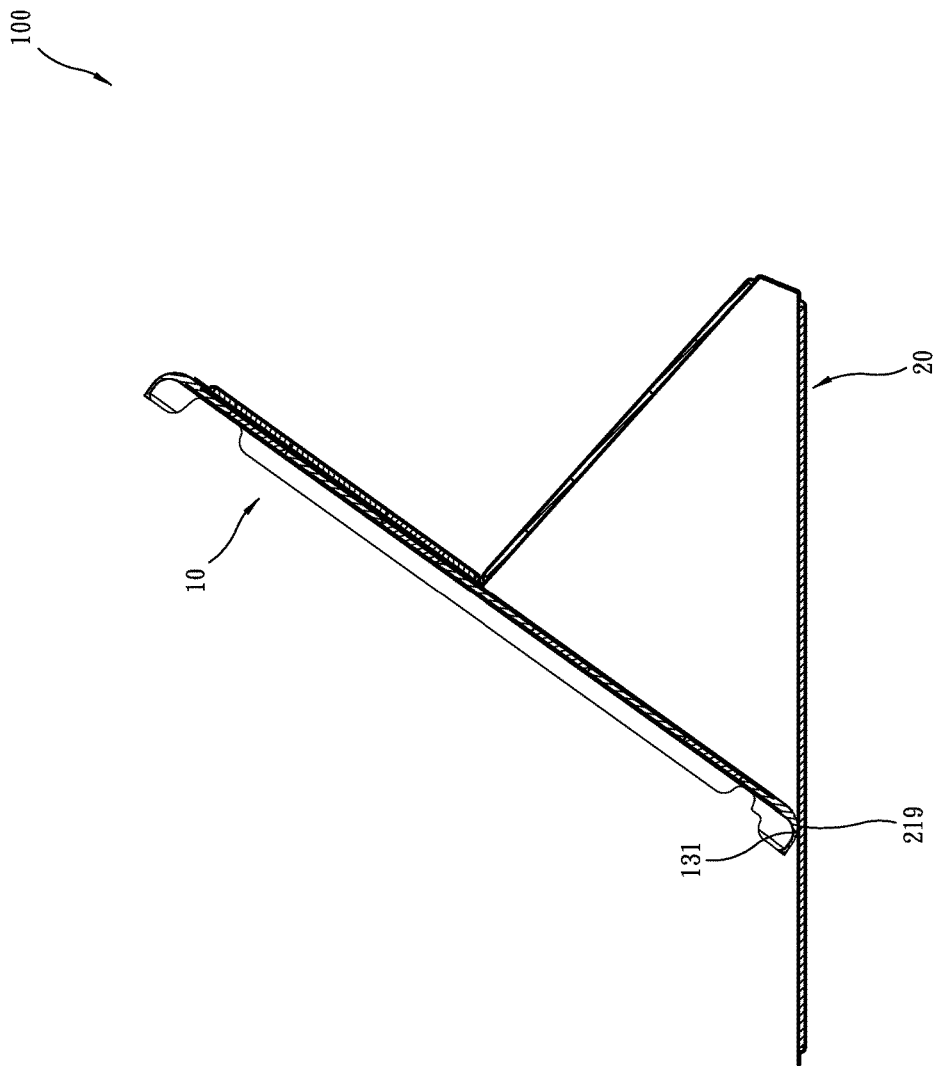
Figure 15:
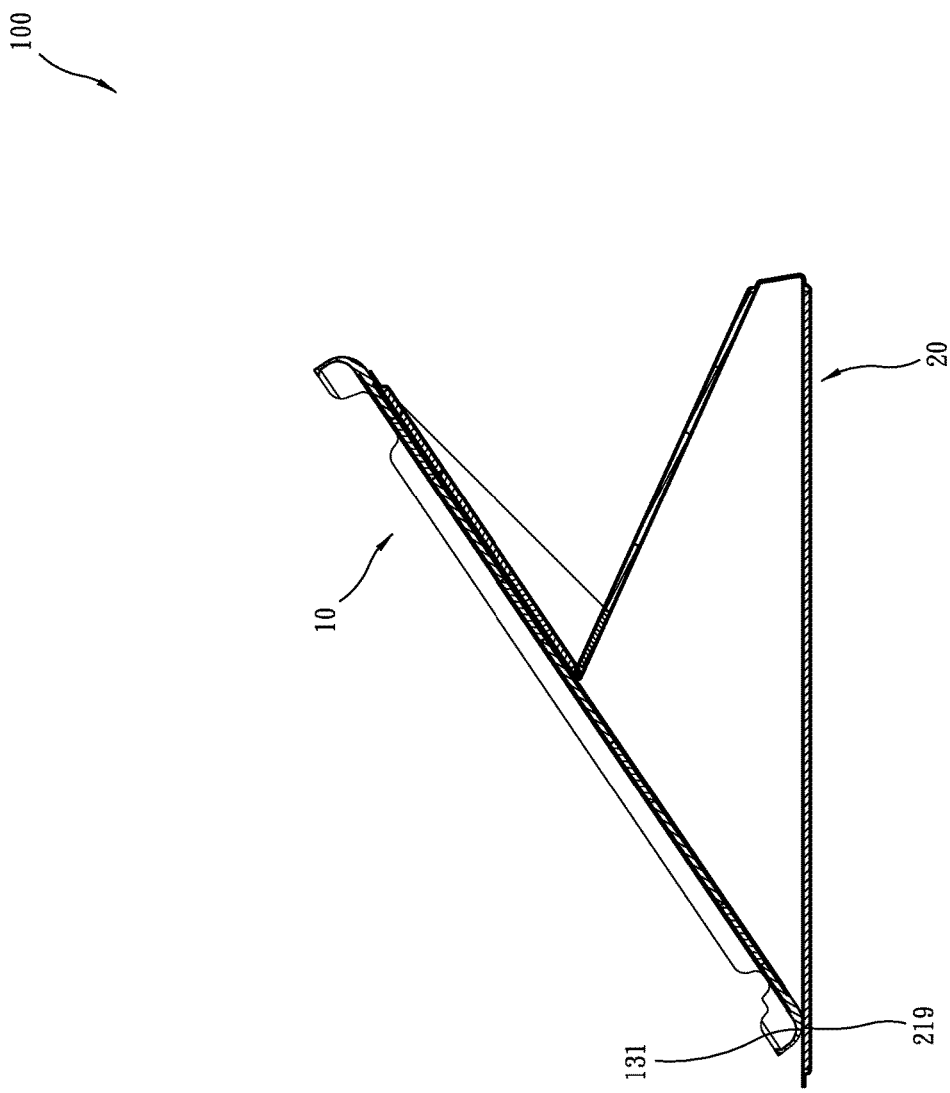

The above provides a description to components/parts, and assembly thereof, of the protection enclosure of the portable electronic device 100 provided according to the first embodiment of the present invention. Features and uses will be described as follows:

When a user attempts to place the protective frame 10 and a portable electronic device (not shown) received and retained therein in a horizontal condition (where the long sidewalls are generally set in a horizontal direction), the user may make the lateral protective frame magnetic attraction rows 121 of the protective frame 10 and the protective cover magnetic attraction rows 221 of the protective cover 20 correspond to and magnetically attract, and thus attach to, each other (as shown in FIG. 12), so as to allow the protective frame 10 to magnetically coupled to the protective cover 20 in a horizontal condition to allow a user to use and operate. In addition, due to contact engagement between the long sidewall skidding preventing interface 131 of the protective frame 10 and the protective cover skidding preventing interface 219 of the protective cover 20, a frictional force induced therebetween can be increased so that regardless the inclination angle relative to a vertical plane, the protective frame 10 can be stably kept in a secured and non-skidding manner in the horizontal condition (as shown in FIGS. 13-15), whereby convenience of adjustment among multiple inclination angles can be realized for use and operation in a horizontal condition.

Figure 16:
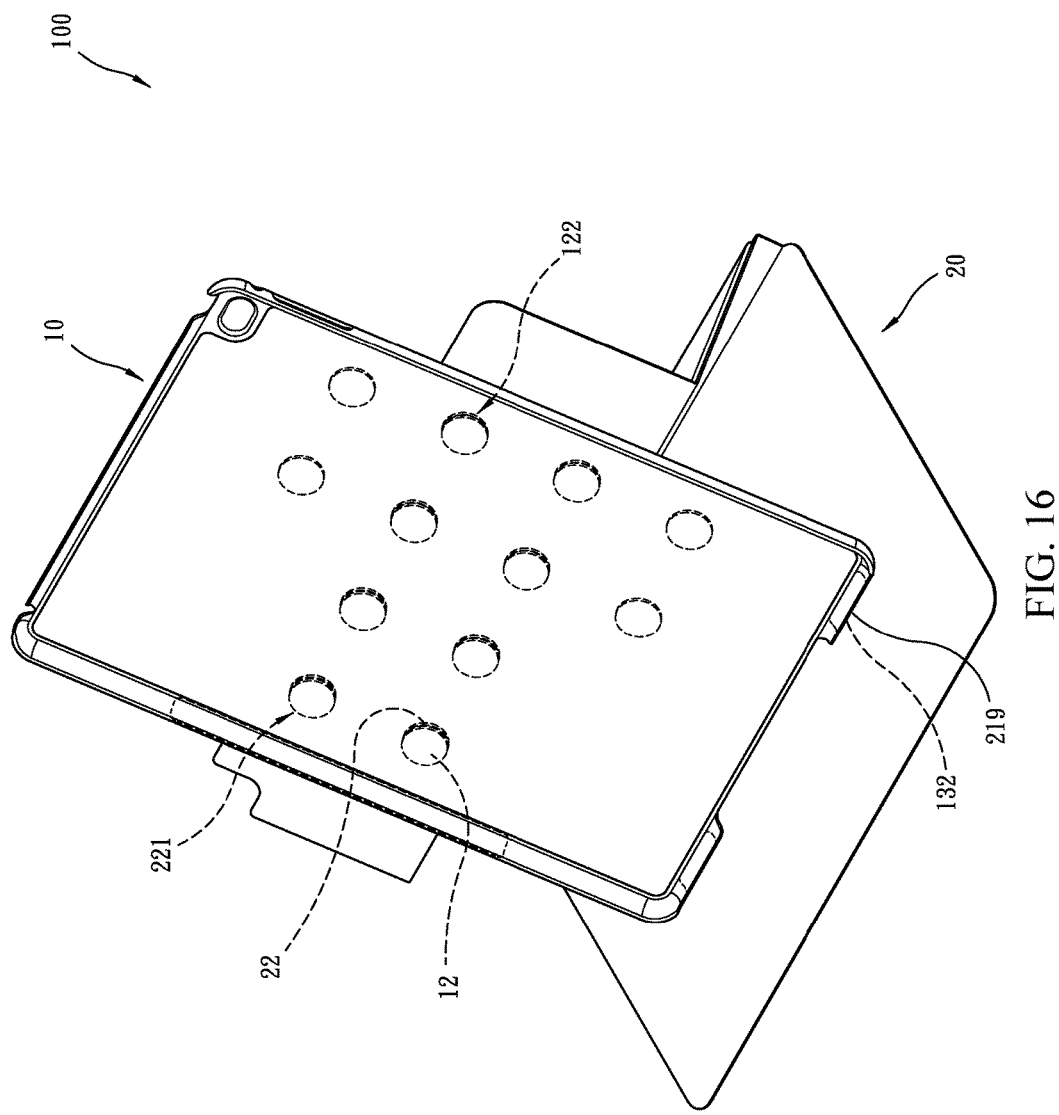
Figure 17:
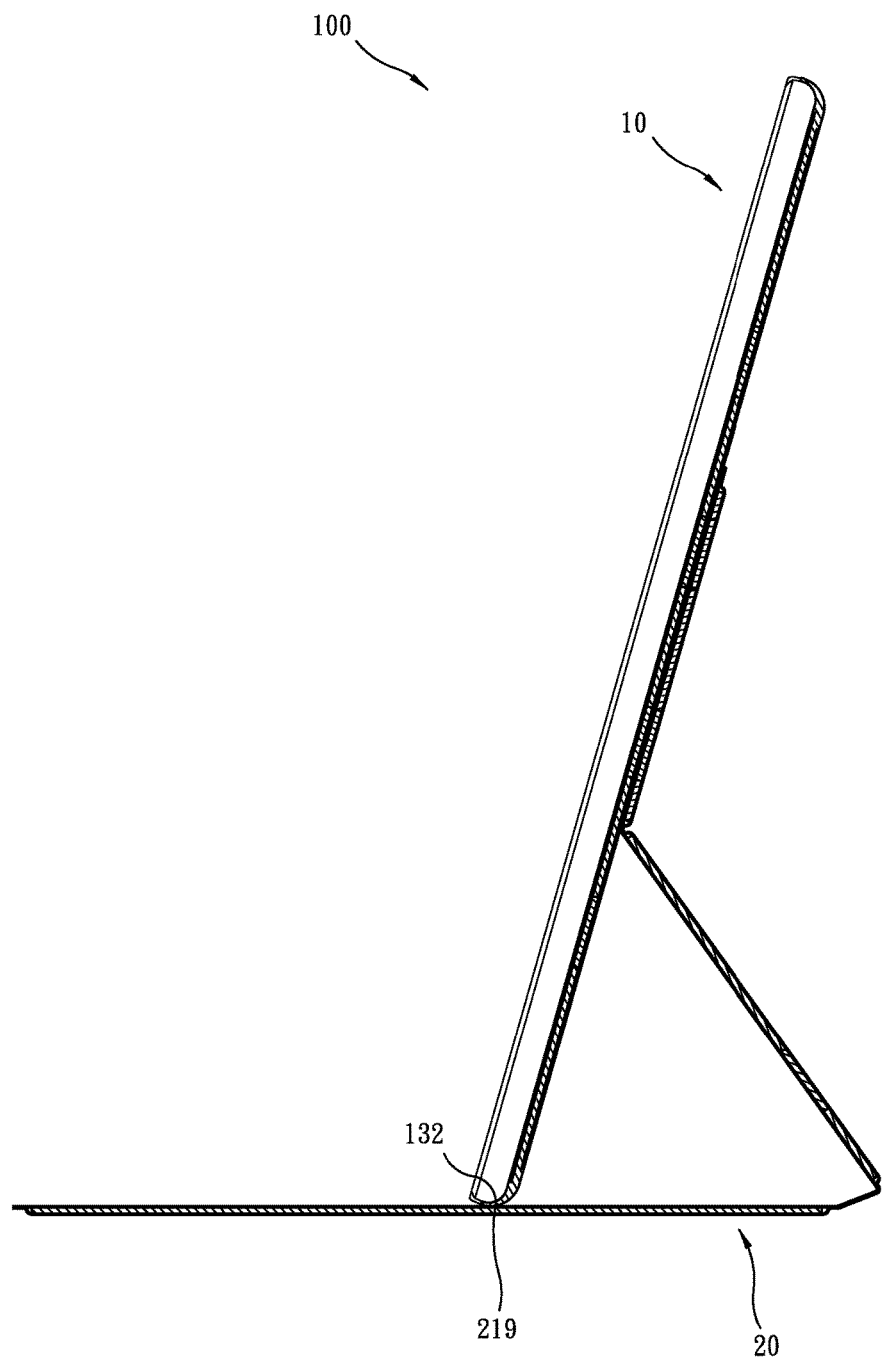
Figure 18:
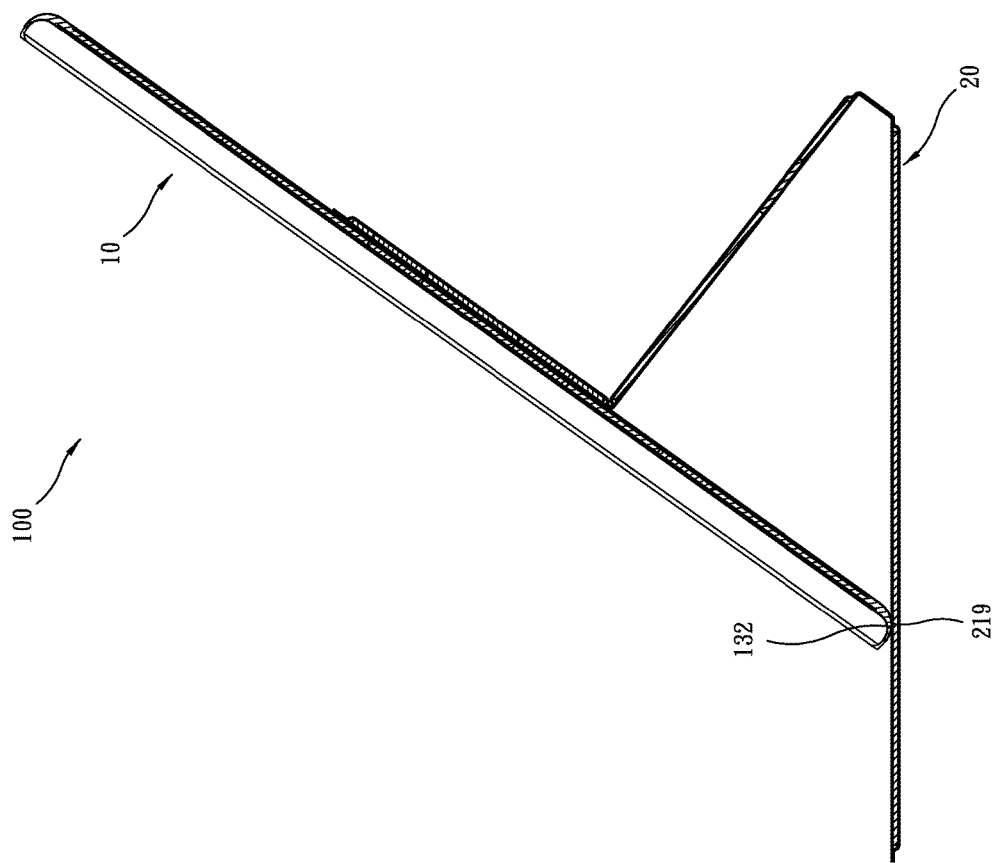
Figure 19:
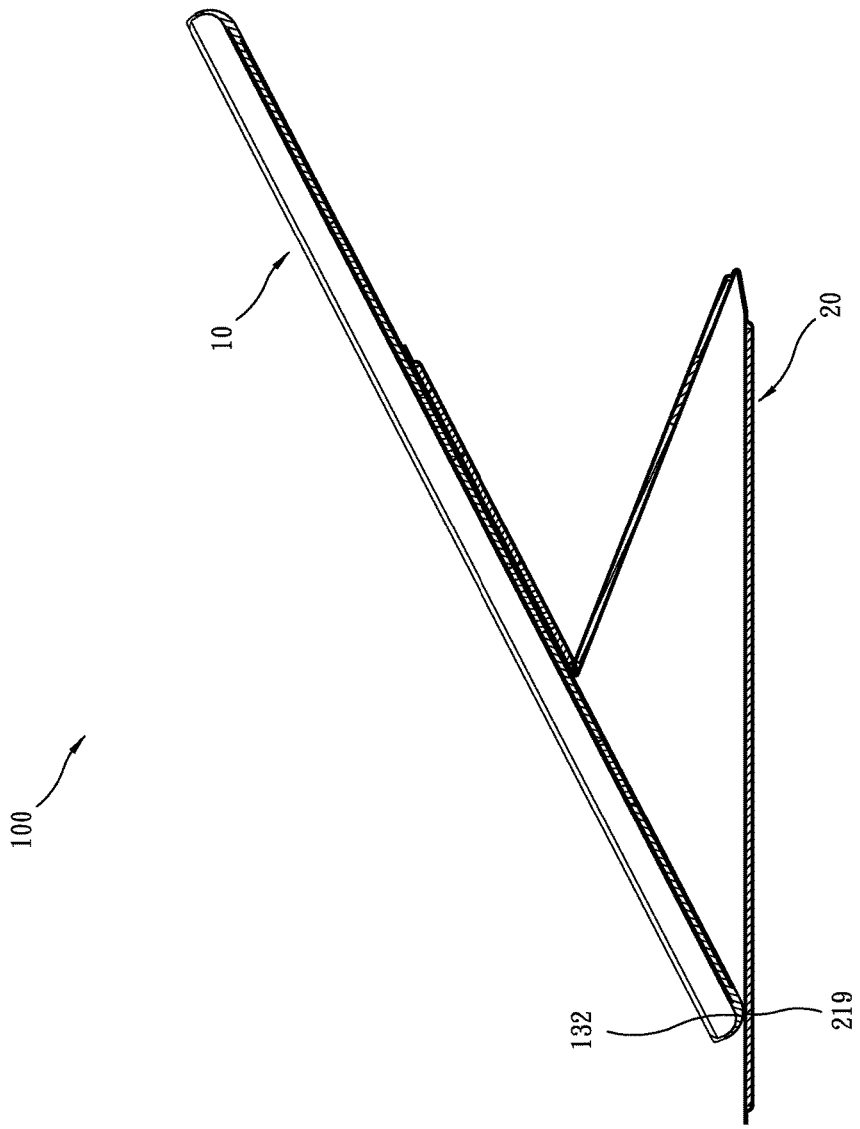

On the other hand, when the attempts to place the protective frame 10 and the portable electronic device (not shown) received and retained therein in a vertical condition (where the long sidewalls are generally set in a vertical or upright direction), the user may make the longitudinal protective frame magnetic attraction rows 122 of the protective frame 10 and the protective cover magnetic attraction rows 221 of the protective cover 20 correspond to and magnetically attract, and thus attach to, each other (as shown in FIG. 16), so as to allow the protective frame 10 to magnetically coupled to the protective cover 20 in a vertical condition to allow a user to use and operate. In addition, due to contact engagement between the short sidewall skidding preventing interface 132 of the protective frame 10 and the protective cover skidding preventing interface 219 of the protective cover 20, a frictional force induced therebetween can be increased so that regardless the inclination angle relative to a vertical plane, the protective frame 10 can be stably kept in a secured and non-skidding manner in the vertical or upright condition (as shown in FIGS. 17-19), whereby convenience of adjustment among multiple inclination angles can be realized for use and operation in a vertical or upright condition.

Figure 20:
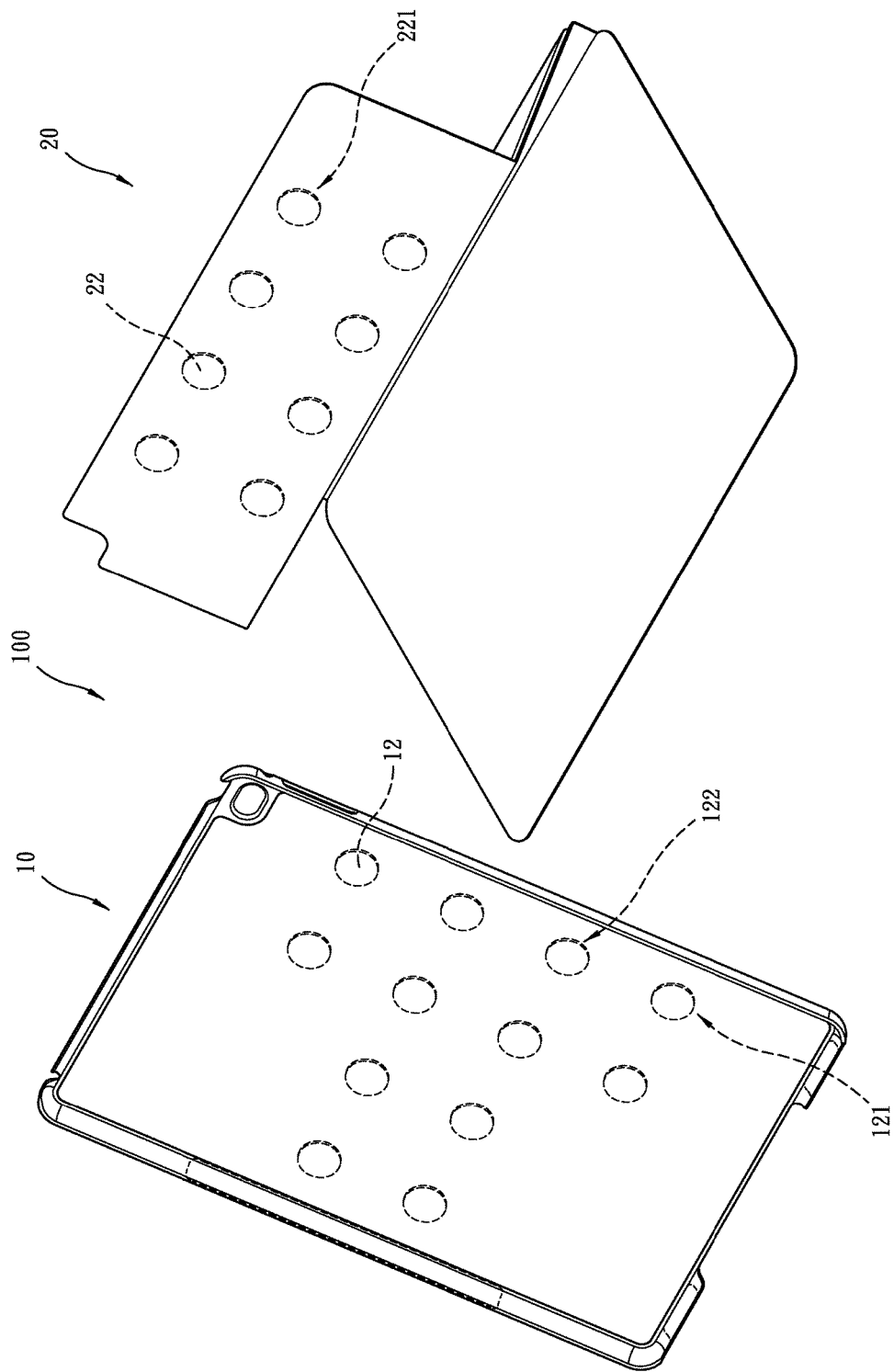
FIGS. 20-22 illustrate conditions of a different way of use of the embodiment illustrated in FIG. 7.
Figure 21:
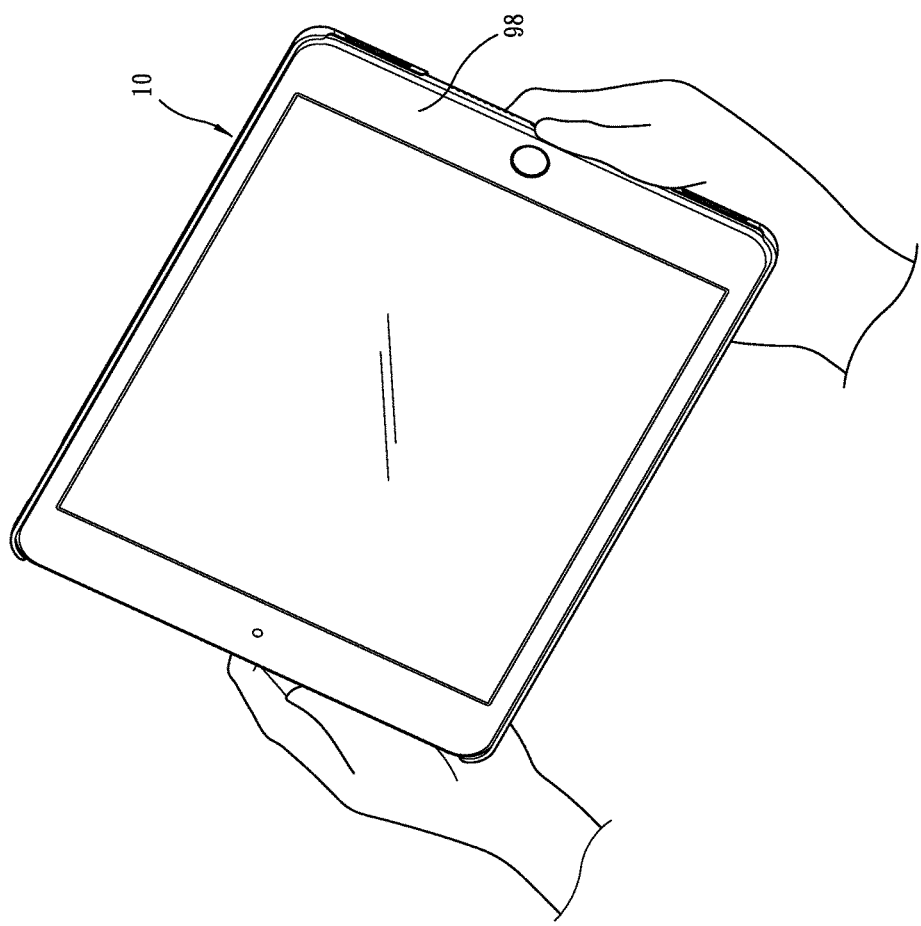
Figure 22:
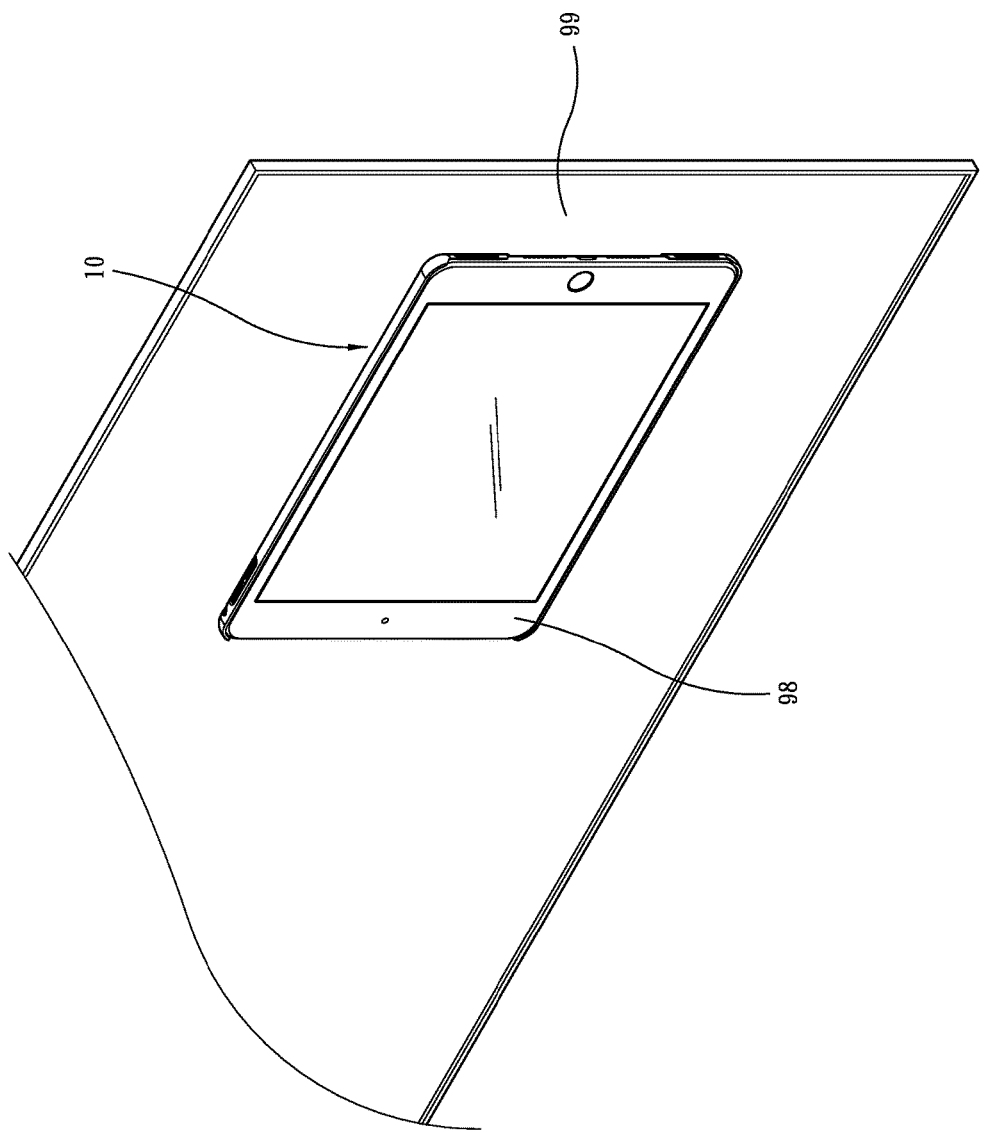

Further, since in the present invention, the protective frame 10 and the protective cover 20 are magnetically attachable to each other by means of the protective frame magnetic members 12 and the protective cover magnetic members 22, the protective frame 10 and the protective cover 20 can easily pulled apart by hand in order to detach and separate from each other without any tool involved (as shown in FIG. 20), whereby the protective frame 10 and the protective cover 20, in such a detached and separated condition, allow the user to hand hold the protective frame 10 for operating the portable electronic device 98 to take a picture or make video recording (as shown in FIG. 21) without any concern that a camera lens of the portable electronic device is shielded by the protective cover 20. In addition, undesired influence caused by the protective cover 20 or additional weight of the protection cover can be eliminated that might hinder and affect playing of a video game. It is also possible, in the condition that the protective frame 10 and the protective cover 20 are detached and separated from each other, to make the protective frame magnetic members 12 of the protective frame 10 magnetically attract and attach to an external object 99 (such a fixture surface exhibiting magnetism), as shown in FIG. 22, this enhancing the use of the present invention.

Figure 23:
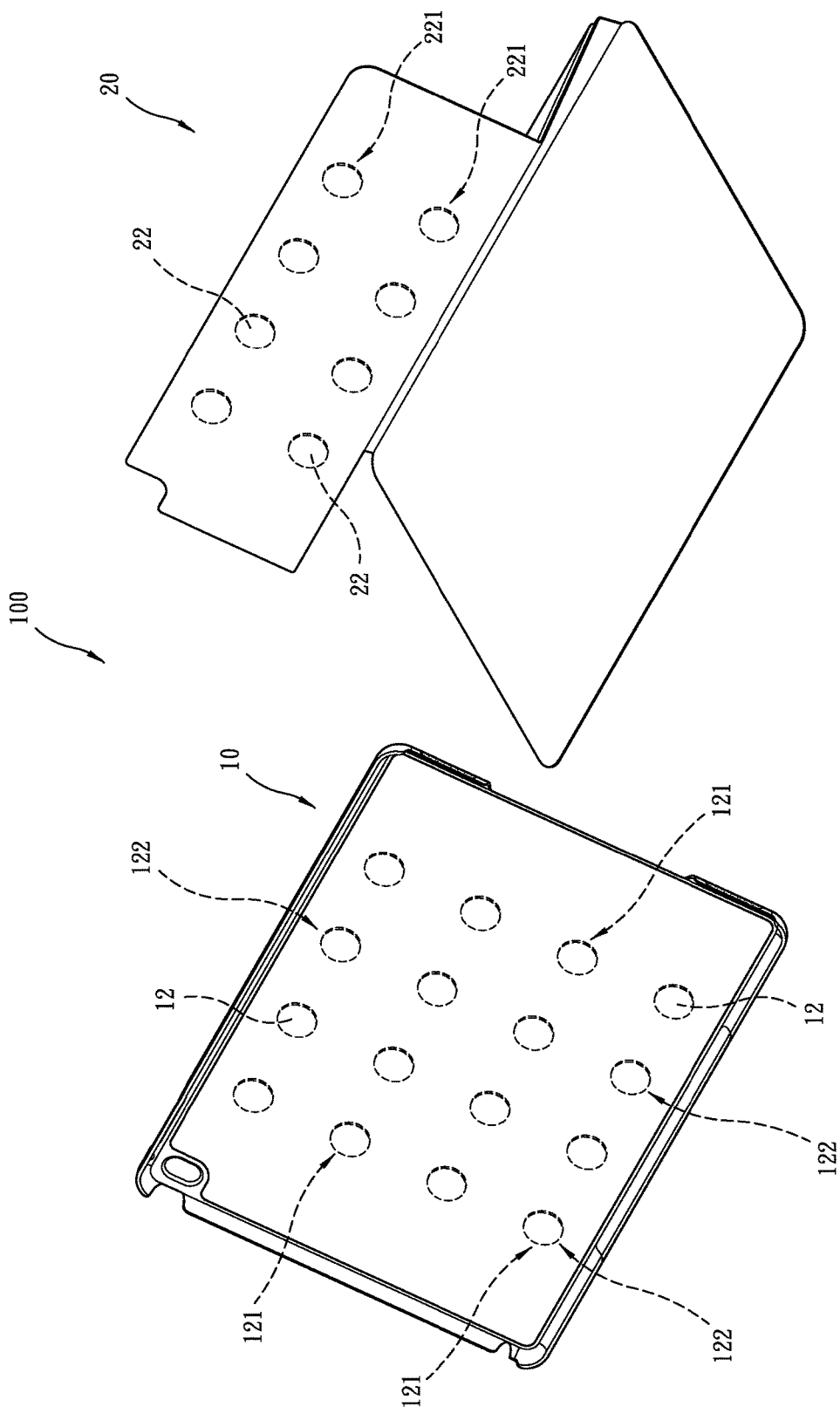
FIGS. 23-24 are schematic views illustrating another configuration of embodying the present invention.
Figure 24:
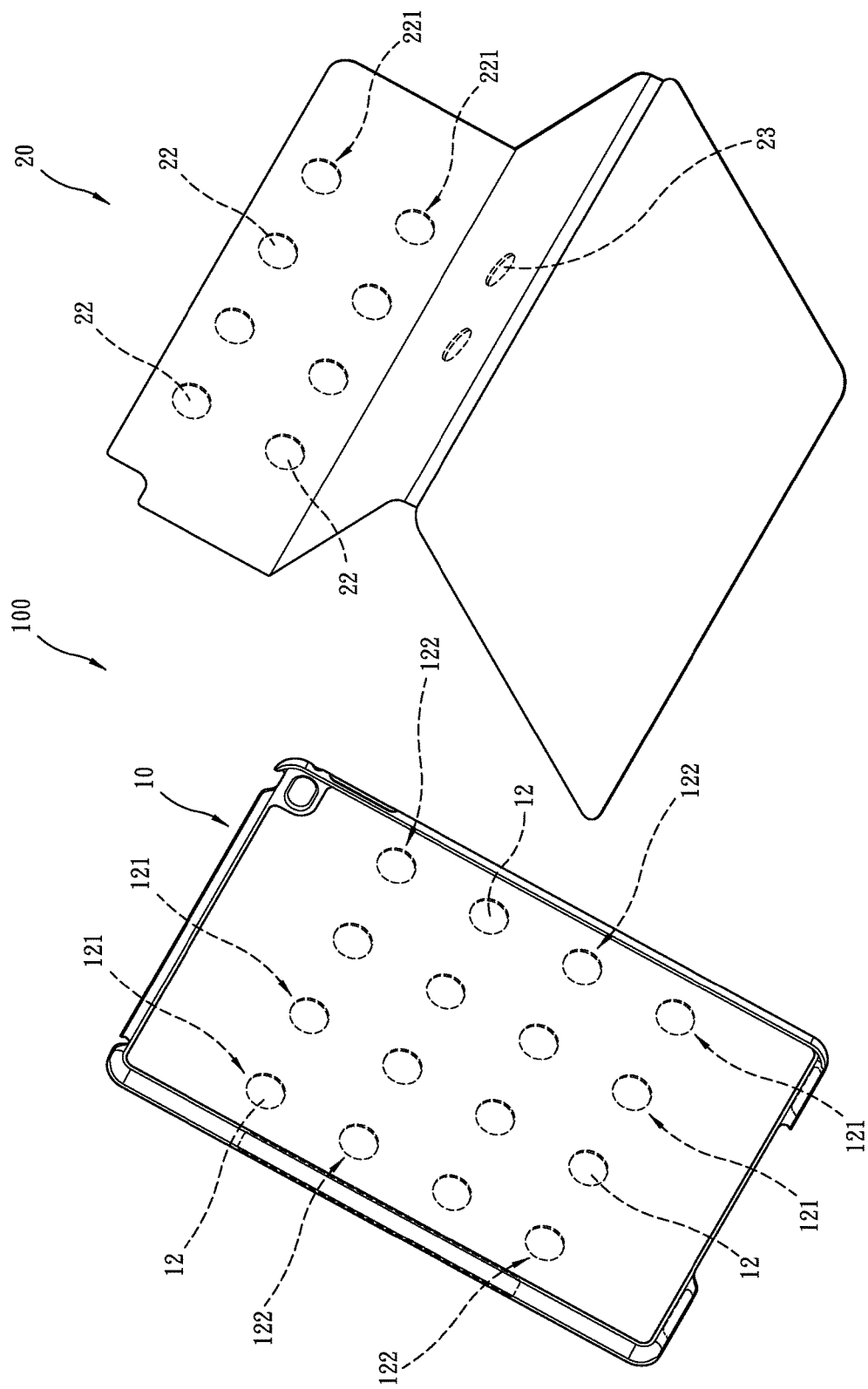
Figure 25:
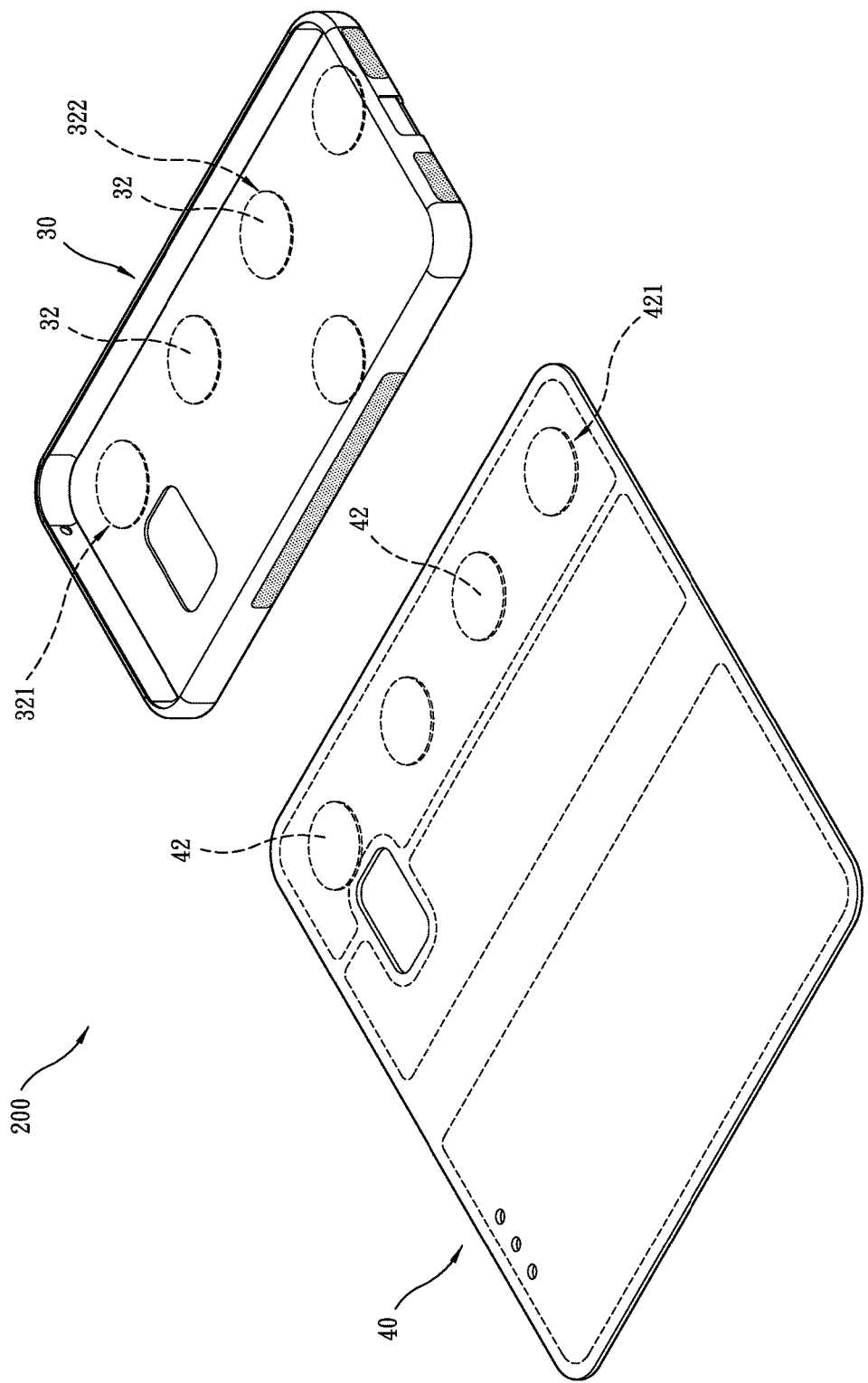
FIG. 25 is an exploded view of a second embodiment provided according to the present invention.
Figure 26:
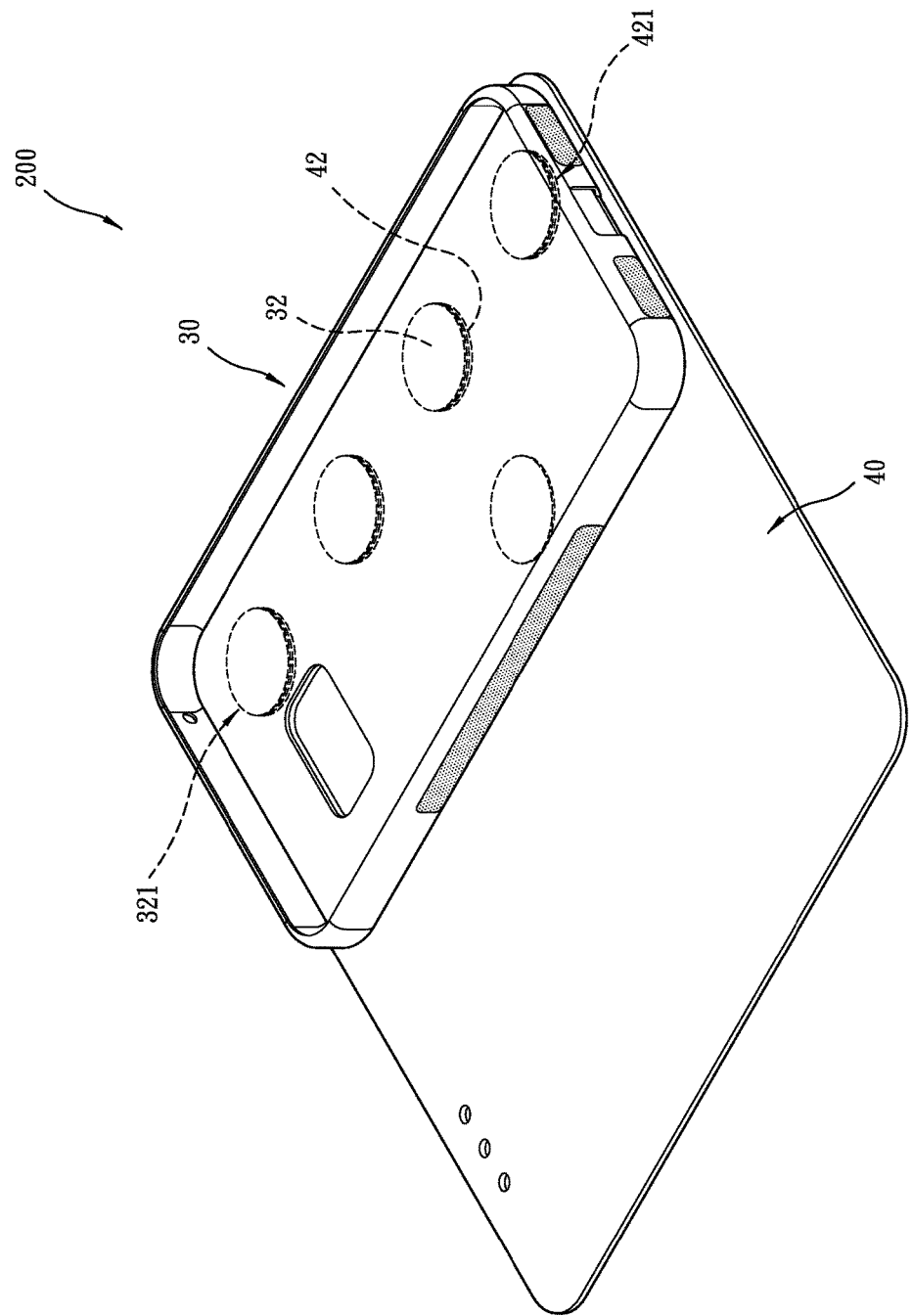
FIG. 26 shows an assembled condition of the embodiment illustrated in FIG. 25.
Figure 27:
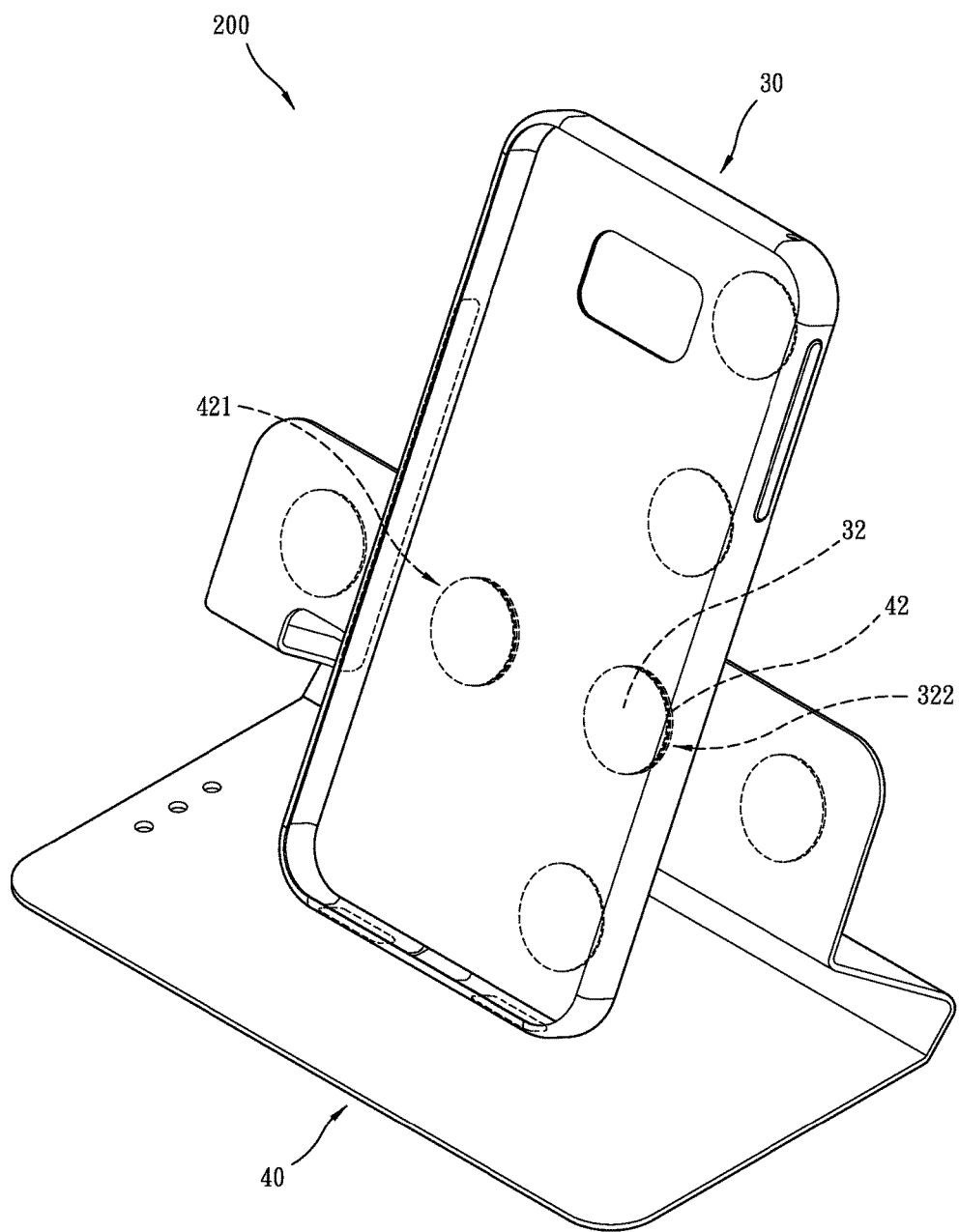
FIGS. 27 and 28 are schematic views illustrating conditions of use of the embodiment illustrated in FIG. 25.
Figure 28:
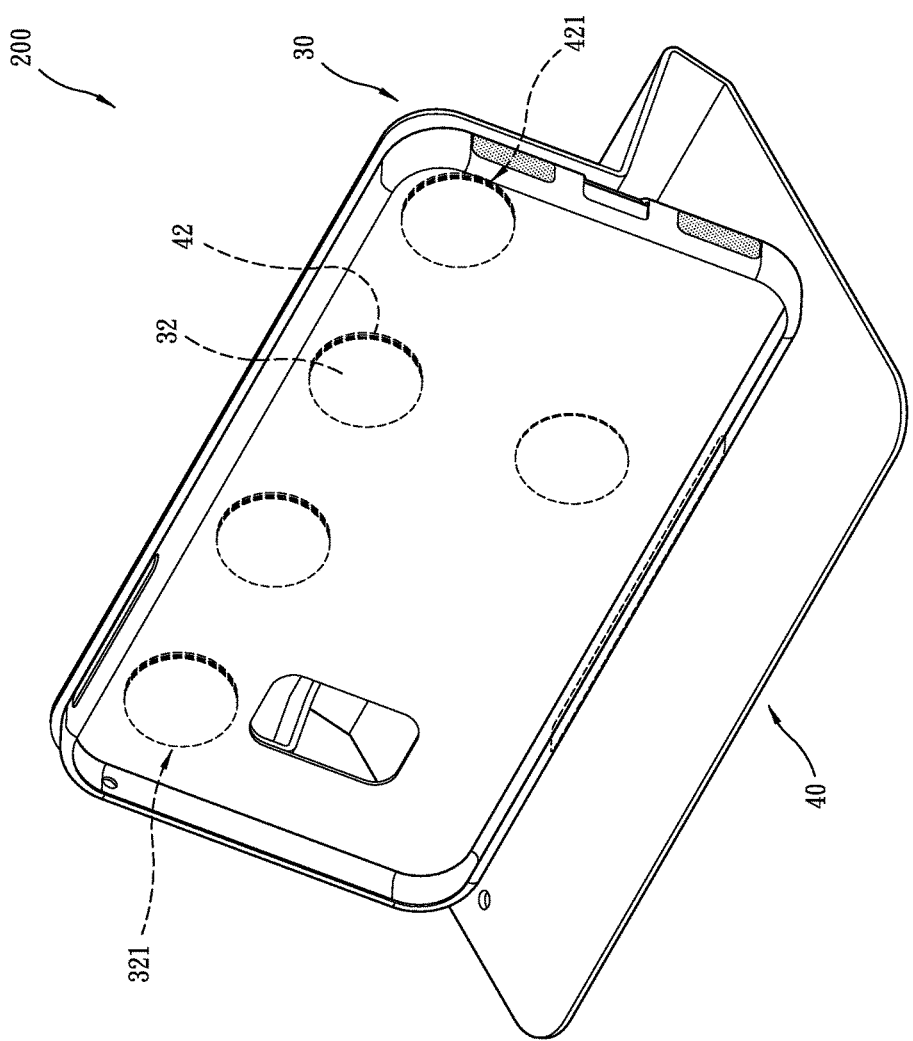

In addition, as shown in FIGS. 23 and 24, the number of the protective frame magnetic members 12 of the protective frame 10 and that of the protective cover magnetic members 22 of the protective cover 20 can be increased (or decreased) as desired to suit for practical needs and the number of the lateral protective frame magnetic attraction rows 121, that of the longitudinal protective frame magnetic attraction rows 122, and that of the protective cover magnetic attraction rows 221 can be increased accordingly to provide the user with an expanded angular range for operation and use.

In the above embodiment, the protective frame magnetic members of the protective frame may comprise magnets, while the protective cover magnetic members of the protective cover comprises magnetic materials, or alternatively, the protective frame magnetic members of the protective frame are magnetic materials, while the protective cover magnetic members of the protective cover are magnets, or further alternatively, the protective frame magnetic members of the protective frame and the protective cover magnetic members of the protective cover are both magnets, all providing the same effectiveness.

According to the preset invention, the protective frame and the protective cover are respectively provided with a plurality of the protective frame magnetic members and the protective cover magnetic members, which are arranged at fixed spacing intervals and distributed in linear forms to provide lateral protective frame magnetic attraction rows, longitudinal protective frame magnetic attraction rows, and protective cover magnetic attraction rows, so that during attachment through magnetic attraction, accurate and precise attachment can be achieved along a straight line, whereby switching of the protective frame and the protective cover between the vertical condition and the horizontal condition may be achieved at precise positions through magnetic attraction and being securely held in such positions by the magnetic attraction, so that undesired position obliqueness and unsecured positioning that are commonly found in the prior art can be avoided.

Referring to FIGS. 25-28, a protection enclosure 200 according to a second preferred embodiment of the present invention for use with a portable electronic device is shown, and comprises, similar to the first preferred embodiment, a protective frame 30 and a protective cover 40; however, a difference between the two embodiments is as follows:

In the instant embodiment, the number of the protective frame magnetic members 32 provided on the protective frame 30 is reduced so that the numbers of the lateral protective frame magnetic attraction rows 321 and the longitudinal protective frame magnetic attraction rows 322 are reduced; and the number of the protective cover magnetic members 42 of the protective cover 40 is reduced and thus, the number of the protective cover magnetic attraction rows 421 is reduced. This is made to suit for a portable electronic device of a different size (for example a mobile phone). However, this change does not affect the effectiveness that the present invention may achieve.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A protection enclosure of a portable electronic device, comprising:
   a protective frame, which comprises a protective frame main body and a plurality of protective frame magnetic members, the protective frame main body being adapted to receive and hold the portable electronic device therein, the protective frame magnetic members being arranged, at intervals, on the protective frame main body and being grouped as multiple lateral protective frame magnetic attraction rows and multiple longitudinal protective frame magnetic attraction rows that is substantially perpendicular to the lateral protective frame magnetic attraction row; and
   a protective cover, which comprises a protective cover main body and a plurality of protective cover magnetic members, the protective cover main body comprising a bottom board, an end board, and a connection board arranged and connected between the bottom board and the end board, such that folding is achievable, in a selective way, between the bottom board and the connection board and folding is achievable, in a selective way, between the connection board and the end board, the protective cover magnetic members being arranged, at intervals, on the end board and being grouped as at least one protective cover magnetic attraction row;
   wherein each of the protective frame magnetic members of the lateral protective frame magnetic attraction rows and the longitudinal protective frame magnetic attraction rows and each of the protective cover magnetic members of the protective cover magnetic attraction row is arranged at a fixed interval; and
   wherein the protective cover magnetic attraction row of the protective cover is selectively magnetically attracted to the lateral protective frame magnetic attraction row or the longitudinal protective frame magnetic attraction row of the protective frame to achieve magnetic attachment therebetween and the protective cover magnetic attraction row of the protective cover is selectively detachable from the lateral protective frame magnetic attraction row or the longitudinal protective frame magnetic attraction row of the protective frame.

2. The protection enclosure of the portable electronic device according to claim 1, wherein the protective frame main body comprises a frame body, a frame body inner covering member, and a frame body outer covering member, the frame body comprising a plurality of protective frame accommodation recesses formed therein at constant intervals, the protective frame magnetic members being respectively received and held in the protective frame accommodation recesses, the frame body inner covering member being set on and covering an inside surface of the frame body, the frame body outer covering member being set on and covering an outside surface of the frame body.

3. The protection enclosure of the portable electronic device according to claim 2, wherein the frame body comprises a bottom wall, two long sidewalls that are respectively connected to two opposite side edges of the bottom wall, and two short sidewalls that are respectively connected to another two opposite side edges of the bottom wall such that the bottom wall, the two long sidewalls, and the two short sidewalls collectively and circumferentially delimit and define a receiving space, in which the portable electronic device is selectively received and held, the protective frame accommodation recesses being formed in the bottom wall, the frame body inner covering member being set on and covering an inside surface of the bottom wall, the frame body outer covering member being set on and covering an outside surface of the bottom wall.

4. The protection enclosure of the portable electronic device according to claim 3, wherein at least one of the long sidewalls of the frame body has an outside surface on which at least one long sidewall skidding preventing interface is provided and at least one of the short sidewalls of the frame body has an outside surface on which at least one short sidewall skidding preventing interface is provided, the protective cover being provided thereon with at least one protective cover skidding preventing interface, such that when the protective cover magnetic attraction row of the protective cover is magnetically attached to the lateral protective frame magnetic attraction row of the protective frame, the long sidewall skidding preventing interface of the protective frame is in contact engagement with the protective cover skidding preventing interface of the protective cover and when the protective cover magnetic attraction row of the protective cover is magnetically attached to the longitudinal protective frame magnetic attraction row of the protective frame, the short sidewall skidding preventing interface of the protective frame is in contact engagement with the protective cover skidding preventing interface of the protective cover.

5. The protection enclosure of the portable electronic device according to claim 1, wherein the protective cover main body comprises a cover body, a cover body inner covering member, and a cover body outer covering member, the cover body comprising a bottom board, an end board, and a connection board, the end board comprising a plurality of protective cover accommodation recesses formed therein at constant intervals, the protective cover magnetic members being respectively received and held in the protective cover accommodation recesses, the cover body inner covering member being set on and covering inside surfaces of the bottom board, the end board, and the connection board of the cover body, the cover body outer covering member being set on and covering outside surfaces of the bottom board, the end board, and the connection board of the cover body.

6. The protection enclosure of the portable electronic device according to claim 5, wherein the cover body inner covering member has a surface on which a protective cover skidding preventing interface is provided; and the protective frame main body comprises a bottom wall, two long sidewalls that are respectively connected to two opposite side edges of the bottom wall, and two short sidewalls that are respectively connected to another two opposite side edges of the bottom wall such that the bottom wall, the two long sidewalls, and the two short sidewalls collectively and circumferentially delimit and define a receiving space, in which the portable electronic device is received and held, and at least one of the long sidewalls of the protective frame main body has an outside surface on which at least one long sidewall skidding preventing interface is provided and at least one of the short sidewalls of the protective frame main body has an outside surface on which at least one short sidewall skidding preventing interface is provided so that when the protective cover magnetic attraction row of the protective cover is magnetically attached to the lateral protective frame magnetic attraction row of the protective frame, the long sidewall skidding preventing interface of the protective frame is in contact engagement with the protective cover skidding preventing interface of the protective cover and when the protective cover magnetic attraction row of the protective cover is magnetically attached to the longitudinal protective frame magnetic attraction row of the protective frame, the short sidewall skidding preventing interface of the protective frame is in contact engagement with the protective cover skidding preventing interface of the protective cover.

7. The protection enclosure of the portable electronic device according to claim 1, wherein the protective cover further comprises a plurality of secondary magnetic members and the connection board comprises a plurality of secondary accommodation recesses formed therein such that the secondary magnetic members are respectively receivable and retained in the secondary accommodation recesses.

8. The protection enclosure of the portable electronic device according to claim 1, wherein the protective frame magnetic members of the protective frame comprise magnets and the protective cover magnetic members of the protective cover comprise magnetic materials.

9. The protection enclosure of the portable electronic device according to claim 1, wherein the protective frame magnetic members of the protective frame comprise magnetic materials, and the protective cover magnetic members of the protective cover comprise magnets.

10. The protection enclosure of the portable electronic device according to claim 1, wherein the protective frame magnetic members of the protective frame and the protective cover magnetic members of the protective cover both comprise magnets.

11. The protection enclosure of the portable electronic device according to claim 1, wherein the protective frame main body comprises a frame body and a frame body inner covering member, the frame body comprising a plurality of non-penetrating the protective frame accommodation recesses arranged at constant intervals, the protective frame magnetic members being respectively received in the protective frame accommodation recesses, the frame body inner covering member being set on and covering an inside surface of the frame body.

* * * * *